United States Patent
Griffin et al.

(10) Patent No.: US 9,679,303 B1
(45) Date of Patent: Jun. 13, 2017

(54) SCRATCH CARDS AND WAGERING GAME ENVIRONMENTS

(75) Inventors: Mary Griffin, Ealing (GB); Andrew C. Guinn, Chicago, IL (US); Jeremy M. Hornik, Chicago, IL (US); Harry C. Lang, Clapham (GB); Daniel P. Louie, Chicago, IL (US); Richard B. Robbins, Glenview, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 997 days.

(21) Appl. No.: 13/287,554

(22) Filed: Nov. 2, 2011

Related U.S. Application Data

(60) Provisional application No. 61/410,733, filed on Nov. 5, 2010.

(51) Int. Cl.
  *G06Q 30/00* (2012.01)
  *G06Q 30/02* (2012.01)

(52) U.S. Cl.
  CPC ............................ *G06Q 30/0214* (2013.01)

(58) Field of Classification Search
  USPC ........................................... 705/14.16
  See application file for complete search history.

(56) References Cited

U.S. PATENT DOCUMENTS

| | | | |
|---|---|---|---|
| 2001/0046891 A1* | 11/2001 | Acres | 463/18 |
| 2003/0154179 A1 | 8/2003 | Mercer | |
| 2004/0204991 A1* | 10/2004 | Monahan et al. | 705/14 |
| 2009/0117989 A1* | 5/2009 | Arezina et al. | 463/20 |
| 2009/0191962 A1 | 7/2009 | Hardy et al. | |
| 2010/0317423 A1 | 12/2010 | Osborne | |
| 2011/0111855 A9 | 5/2011 | Hardy et al. | |

OTHER PUBLICATIONS

Jarvis, "The internet is the social network", BuzzMachine, Feb. 2, 2008.*

* cited by examiner

*Primary Examiner* — Amanda Abrahamson
*Assistant Examiner* — Scott C Anderson
(74) *Attorney, Agent, or Firm* — DeLizio Law, PLLC

(57) ABSTRACT

A computerized method includes receiving, at an online wagering game establishment and from a number of persons, a link that comprises a request to play an electronic scratch card. The method includes presenting for play the electronic scratch card to the number of persons. The method includes dynamically assigning by the online wagering game establishment, results of the play of the electronic scratch card by the number of players, wherein the results comprise at least one of a loss or a win. The win comprises a bonus monetary amount. The bonus monetary amount is usable within the online wagering game establishment and non-usable external to the online wagering game establishment. The method includes outputting the results of the play of the electronic scratch card to the number of persons.

33 Claims, 22 Drawing Sheets

SCRATCH CARDS AND WAGERING GAME ENVIRONMENTS

RELATED APPLICATIONS

This application claims the priority benefit of U.S. Provisional Application Ser. No. 61/410,733 filed Nov. 5, 2010.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2011, WMS Gaming, Inc.

FIELD

Embodiments of the inventive subject matter relate generally to wagering game systems, and more particularly scratch card activity that drives player traffic to wagering game establishments.

BACKGROUND

Wagering game machines, such as slot machines, video poker machines and the like, have been a cornerstone of the gaming industry for several years. Another option that is available in some jurisdictions is online wagering game activity. Generally, the popularity of such machines and activities depends on the likelihood (or perceived likelihood) of winning money and the intrinsic entertainment value relative to other available gaming options. Where the available gaming options include a number of competing wagering game machines and online activities and the expectation of winning at each is roughly the same (or believed to be the same), players are likely to be attracted to the most entertaining and exciting machines and online activities. Shrewd operators consequently strive to employ the most entertaining and exciting machines and online activities, features, and enhancements available because such machines and online activities attract frequent play and hence increase profitability to the operator. Therefore, there is a continuing need for wagering game machine manufacturers and online wagering game developers to continuously develop new games and gaming enhancements that will attract frequent play.

BRIEF DESCRIPTION OF THE FIGURES

Embodiments of the invention are illustrated in the Figures of the accompanying drawings in which.

DESCRIPTION OF THE EMBODIMENTS

Figure 1:
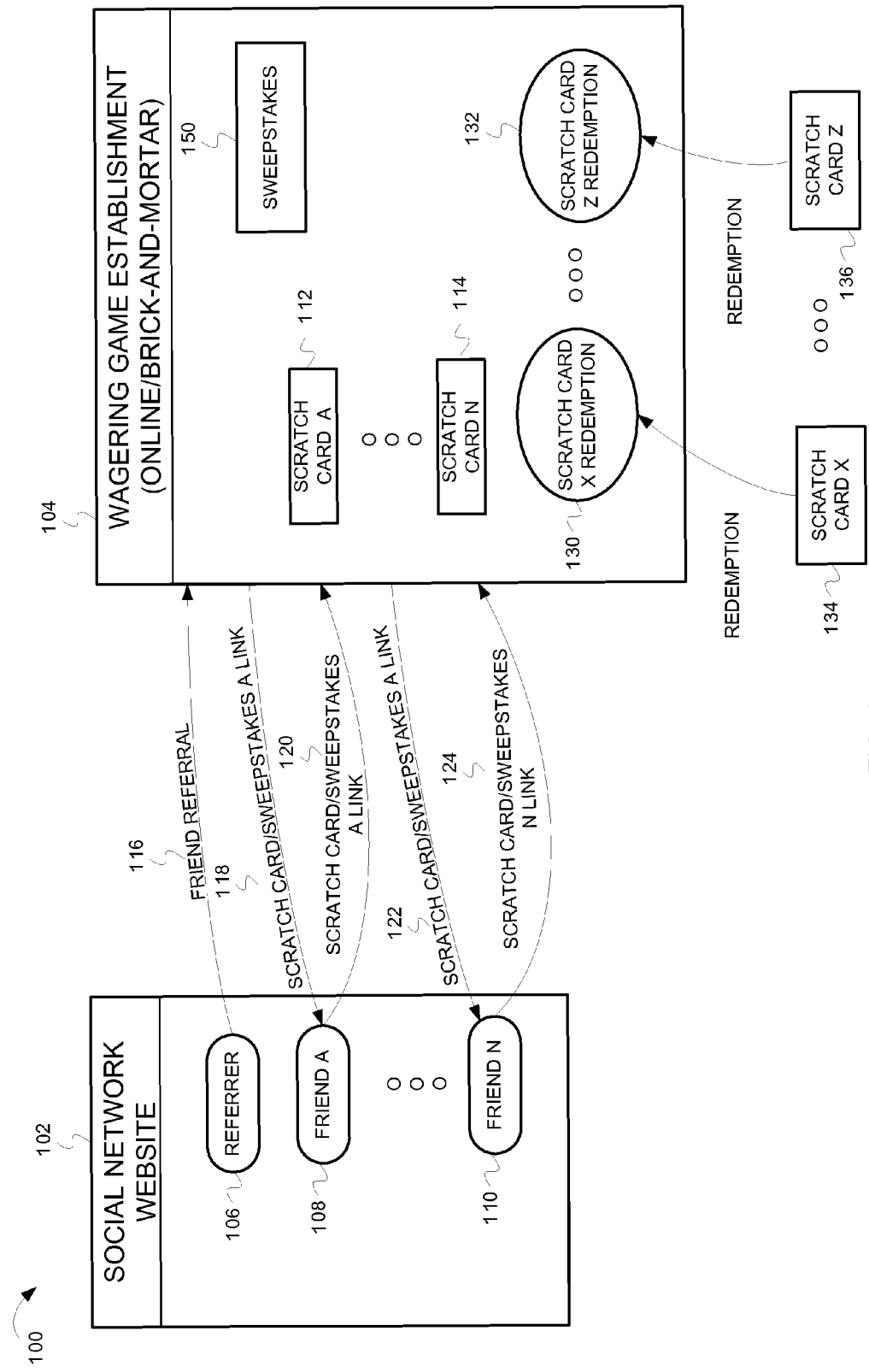
FIG. 1 is a diagrammatic illustration of a system for driving wagering game traffic using scratch cards, according to some example embodiments.

This description of the embodiments is divided into six sections. The first section provides an introduction to some example embodiments, while the second section describes an example system architecture. The third section describes different examples of scratch cards, and the fourth section describes example operations performed by some embodiments. The fifth section describes example operating environments (including an example machine architecture and an example wagering game machine). The sixth section presents some general comments.

INTRODUCTION

This section provides an introduction to some example embodiments that use scratch cards to drive wagering game environment traffic. The scratch cards can be both physical (such as cardboard) and electronic. The wagering game environment can be both brick-and-mortar sites (such as casinos) and online websites. Some example embodiments increase the traffic to these wagering game environments using different types of scratch cards. In some example embodiments, the wagering game establishment dynamically assigns prizes of a scratch card.

For a given scratch card, a player can enter the card number and the revealed win identifier (e.g., timestamp, big win identification) at the online wagering game website. Alternatively or in addition, the player can redeem at a brick-and-mortar wagering game establishment. For example, the player can place the scratch card into an input component of a device at a wagering game establishment (e.g., wagering game machine). The device can then scan the card number and the win identifier from the scratch card to determine the prize. If the scratch card is electronic and a player wants to redeem at a brick-and-mortar site, the player can print out a bar code representing a resulting of the scratch card. A device at the brick-and-mortar site can then scan the bar code for redemption. Alternatively or in addition, the player can have the bar code transmitted to a mobile device (e.g., a smart phone). The device at the brick-and-mortar site can then scan the bar code from the display of the mobile device for redemption. The prize can include a bonus monetary amount, a real monetary amount, comps for a room or dinner, free play credits for games at the wagering game establishment (either online or brick-and-mortar), etc. The prize can also include non-monetary items such as upgraded avatars or custom themes for a player for their account at an online wagering game website. In contrast to a real monetary amount, a bonus monetary amount has play through requirements, wherein the monetary amount must to be spent at the wagering game establishment. In other words, a bonus monetary award cannot be redeemed for cash.

Additionally, the prize from the scratch card can be associated with a player membership for the wagering game establishment. Accordingly, the player receives additionally awards that are associated with their membership (e.g., membership points). The wagering game establishment can also include a sweepstakes game that can be played separately or in conjunction with the scratch cards. The prizes can comprise a sweepstakes real monetary award that can be cashed out and not required to be used at the wagering game establishment. In some example embodiments, the bonus monetary amount and/or the sweepstakes monetary amount are dynamically determined, wherein the wagering game establishment randomly assigns the values of these awards. Also, the scratch cards can be associated with progressive jackpot games that are being played at the wagering game establishment (e.g., online wagering game website). The progressive jackpot games are such that the value of the payout increases over time as the games are played.

Some example embodiments incorporate social networking for scratch game play to increase traffic to wagering game establishments. The scratch cards can be played electronically through different social networking websites (e.g., Facebook, MySpace, etc.), web banners, toolbars of web applications, etc. In some instances, the online wagering game establishment hosts the play of electronic scratch cards. Also, current members of the wagering game establishment (known as "referrers") can invite their social networking friends (known as "referrees") to play a scratch card. The invite can include a link for a free play of a scratch card. The invite can also include a screenshot or video replays of a recent win, spin, image of a trophy won from a game, leadership position for the game, etc. For example, the screenshot or video replays can be embedded items in the social networking website (e.g., a posting on a wall). Therefore, any number of members of the social networking website can invite their friends to play a free scratch card. In turn, any of these friends can invite any number of their friends to play a free scratch card, etc. Accordingly, a viral aspect of driving persons to a wagering game establishment is created through social networking In particular, these invites (to play a free scratch card at the wagering game establishment) can virally permeate a large segment of the members of the social networking website very quickly because of the relationships among the membership.

The wagering game website and/or social networking website can provide incentives to referrers for sending invites to referrees. For example, the incentives can be a free scratch card, a bonus monetary award, loyalty points, etc. Other incentives can include free entries into a sweepstakes drawing occurring on the wagering game website, monetary amounts, physical scratch cards, electronic scratch cards, etc. The incentives can be given based on sending the invite, a successful referral, etc. A referral is considered "successful" after the referree signs-up, deposits monies, plays a predetermined amount of wagering games, etc. Also in some example embodiments, the distribution of the free scratch cards is limited. In one example, a unique code is associated with the scratch card, and the online wagering game website can track this unique code. After one play using the unique code, the unique code is no longer usable.

As noted above, scratch cards can include various types of win identifiers that are input as part of the redemption of the scratch card. For example, the scratch cards can include timestamps that are revealed after players scratch-off (physically or electronically) the cards. These timestamps are associated with a progressive jackpot game at the wagering game establishment. The scratch cards can comprise multiple progressive levels, wherein each level is associated with a timestamp. The progressive level associated with a win can be based on symbols revealed during the scratch-off process. For example, one star revealed is associated with a first progressive level, two stars revealed is associated with a second progressive level, three stars revealed is associated with a third progressive level, etc. Accordingly, the number of stars revealed dictates which revealed timestamp is associated with this scratch card. The player can then redeem the scratch card at a wagering game establishment (online or brick-and-mortar). In particular, each scratch card can have an associated card number. The player can input the associated card number and timestamp tied to a progressive level for a progressive jackpot game executing at the wagering game establishment.

As further described below, a timestamp is one example of a revealed win identifier for a scratch card. Other examples include matching monetary amounts, a big win identifier number, bingo card numbers for bingo-related scratch cards, poker hand numbers for poker-related scratch cards, etc.

While described in reference to electronic scratch cards, in some other example embodiments, this electronic version can be expanded to cover picking games. The picking games can include any number of covered boxes on a display. A player can electronic uncover boxes until a symbol is uncovered denoting the end of the game. The player is rewarded a prize based on the uncovered boxes revealed prior to revealing the symbol denoting the end of the game (i.e., end of game symbol). Accordingly, if first box uncovered reveals the end of game symbol, no prize is awarded. In some configurations, the player is rewarded the aggregate prizes revealed prior to the end of game symbol being revealed. In some other configurations, the player is rewarded the largest prize revealed prior to the end of game symbol being revealed.

Therefore, some example embodiments enable customer acquisition for the wagering game establishments through play of scratch cards that requires interaction with the wagering game establishment for game play, redemption, use of bonus money won, etc. Also, some example embodiments provide an introduction of game play available at the wagering game establishment. However, for full wagering game play, persons are required to enter the wagering game establishment, become members of the wagering game establishment, etc.

System Architecture

FIG. 1 is a diagrammatic illustration of a system for driving wagering game traffic using scratch cards, according to some example embodiments. In particular, FIG. 1 illustrates two different aspects that can drive traffic to a wagering game establishment using scratch cards. A first aspect is based on referrals for limited free play of a scratch card through a social networking website. A second aspect is based on a requirement that a scratch card be redeemed at the wagering game establishment. These two aspects may be combined or remain separate.

A system 100 includes a social network website 102, a wagering game establishment 104, and a number of scratch cards (a scratch card X 134, a scratch card Z 136, etc.). Examples of the social networking website 102 can include Facebook, MySpace, etc. The wagering game establishment 104 can be either online or brick-and-mortar. For example, the wagering game establishment 104 can be an online wagering game website, casino, etc.

In this example, the social network website 102 includes accounts for a number of users. A referrer 106 and friends of the referrer (a friend A 108, a friend N 110, etc.) are users having an account on the social network website 102. In one example application, the referrer 106 can be a member of the wagering game establishment 104, while the friends of the referrer can be potential members of the wagering game establishment.

The wagering game establishment 104 includes a number of scratch cards (a scratch card A 112, a scratch card N 114, etc.). In some example embodiments, players can play the scratch cards 112-114 that are being hosted by the wagering game establishment 104 such that the game play is being displayed at the social network website 102. As shown, the referrer 106 sends a friend referral 116 for one or more of their friends on the social network website 102. The friend referral 116 can comprise a list of names of one or more of their friends. In response to the friend referral 116, the wagering game establishment 104 can send invites to play a scratch card to those friends designated by the friend referral 116. In this example, the wagering game establishment 104 sends invites to the friend A 108 and the friend N 110. An invite is shown as a scratch card A link 118 to the friend A 108. Another invite is shown as a scratch card N link 122 to the friend N 110. In some example embodiments, the invites are clickable web links that initiate game play of the scratch cards. An initiation of a play of a scratch card is shown by the friend A 108 sending a scratch card A link 120. Another initiation of the play of another scratch card is shown by the friend N 110 sending a scratch card N link 124.

The wagering game establishment 104 can host play of the electronic scratch cards, while the social network website 102 displays the play using some type of multimedia platform (e.g., Adobe Flash) to enable interactivity to web pages. Alternatively, the player can play the scratch cards directly at the wagering game establishment 104, without game play of the scratch card being displayed at the social network website 102.

In some example embodiments, the prizes from the scratch cards can comprise bonus monetary amounts that are required to be spent at the online wagering game website. Alternatively or in addition, the prizes can comprise a monetary amount, comps for a room or dinner, etc. The wagering game establishment 104 can dynamically assign the awards to the different scratch cards. Accordingly, some example embodiments include bonus monetary amounts that are dynamically distributed from a central server. These scratch cards are used to drive more player traffic to the wagering game establishment 104. This player traffic could allow for more persons to become members of the wagering game establishment 104, wager on other wagering games, etc.

The wagering game establishment 104 can provide incentives to the referrer 106 to send invites to their friends on the social network. For example, the incentives can be a free scratch card, a bonus monetary amount, loyalty points, etc. The incentives can be given based on sending the invite, a successful referral, etc. A successful referral can be after the friends sign up, deposit monies, play through X (administrable) amount of play, etc. Also in some example embodiments, the distribution of the free scratch cards is limited. In one example, a unique code is in the link that is sent to potential players in the social networking website. The wagering game establishment can track this unique code. After one play using the unique code, the unique code is no longer usable.

The wagering game establishment 104 can also redeem scratch cards. This redemption can be another aspect that drives traffic to wagering game establishments. This redemption may or may not be separate from the social networking aspect for driving traffic.

Persons can redeem scratch cards 134-136. In some example embodiments, players play the scratch cards 134-136, independent of the wagering game establishment 104. The players can then redeem the scratch cards 134-136 at the wagering game establishment 104. For example, if the scratch cards 134-136 are electronic, an online wagering game establishment can redeem the scratch cards 134-136. If the scratch cards 134-136 are physical cards, a device at a brick-and-mortar wagering game establishment can redeem the scratch cards 134-136. The requirement of redemption of the scratch cards 134-136 at the wagering game establishment drives players to the establishment. In this example, the wagering game establishment 104 redeems the scratch card X 134 (shown as the scratch card X redemption 130). The wagering game establishment 104 redeems the scratch card Z 136 (shown as the scratch card Z redemption 132).

The wagering game establishment 104 also includes a sweepstakes 150 to enable players to enter into a sweepstakes to win. In some example embodiments, the prizes from the sweepstakes 150 can be an actual monetary amount. The wagering game establishment 104 can determine who can enter and the number of times of entry. For example, members of the wagering game establishment 104 are allowed limited repeated entries into the sweepstakes, while non-members are allowed a single entry. In one example, the non-members are allowed entry into the sweepstakes in conjunction with the play of a scratch card, redemption of a scratch card, etc.

The wagering game establishment 104 illustrates different operations that are driving persons to visit the waging game establishment 104. The different operations include free scratch card play based on bonus money that is dynamically determined, free scratch card play through a social network site, sweepstakes play, redemption of scratch cards, etc. These operations can be independent or dependent of each other. While described relative to an online wagering game establishment, some or all of the operations can be performed at a brick-and-mortar wagering game establishment. In particular, different devices therein can perform the operations. For example, a wagering game machine, redemption device, etc. can present the scratch cards, redeem scratch cards, etc. The scratch cards 134-136 can be both physical (such as cardboard) and electronic.

In some example embodiments, players can replay scratch cards they previously played or view the play of a scratch card by a different player. In some applications, the player can replay for a prize if the reveals behind the scratch-offs are changed relative to the previous play. The players may or may not be required to pay for additional replays.

In some example embodiments, referrers can attach the scratch cards to meeting or event invites that are sent to the referrees. For example, the referrers can send these meeting or event invites through the social networking website 102. Instead of individual persons being referrers, in some example embodiments, the scratch card links can be embedded in different merchant web pages. In such a configuration, the revenue generated from the persons playing such scratch cards can be shared with the merchant. In some example embodiments, affiliates of the wagering game establishment 104 can distribute and process the scratch cards (instead of distribution directly from the wagering game establishment 104).

As further described below, the scratch cards may or may not be tied to different games (e.g., progressive jackpot games) at the wagering game establishment. Examples of different types of scratch cards are now described in reference to FIGS. 2-16.

Example Scratch Cards

FIGS. 2-16 illustrate different scratch cards, according to some example embodiments. The scratch cards can be representative of scratch card 112-114 played in conjunction with the social network website 102 and representative of the scratch cards 134-136 that can be redeemed at the wagering game establishment 104.

Figure 2:
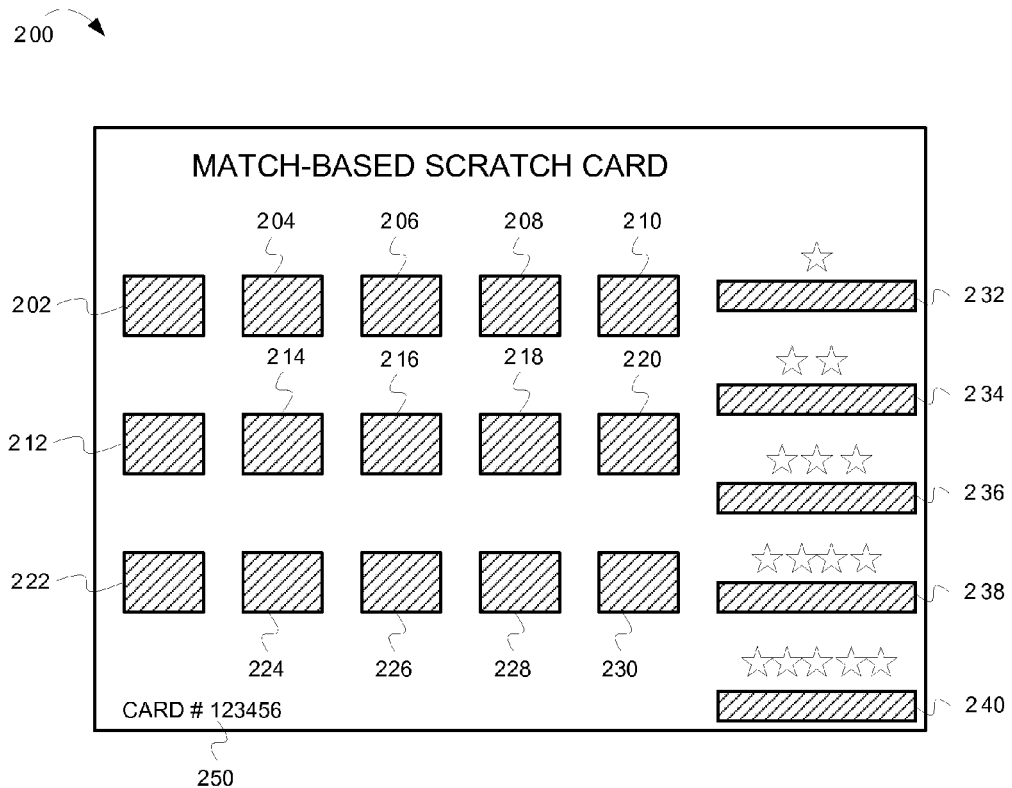
FIG. 2 illustrates an un-played match-based scratch card, according to some example embodiments.

An example match-based scratch card is now described with reference to FIGS. 2-4. FIG. 2 illustrates an un-played match-based scratch card, according to some example embodiments. In particular, FIG. 2 illustrates a scratch card 200 wherein scratch-off has not yet occurred to reveal the result of play of the scratch card 200. The scratch card 200 includes scratch-off boxes 202-240 that have not yet been scratched-off to reveal the result. For example, for a physical scratch card, a film overlays the scratch-off boxes 202-240 to hide the characters or graphics. For an electronic scratch card, a graphic overlays the scratch-off boxes 202-240 to hide the characters or other graphics. For a physical scratch card, as a player rubs the overlaying film, the hidden characters or graphics are exposed. For an electronic scratch card, as a player provides input to remove the overlaying graphics, the hidden characters or graphics are exposed. These hidden characters or graphics indicate results of play of the scratch card 200. The scratch card 200 also includes a scratch card number 250.

Figure 3:
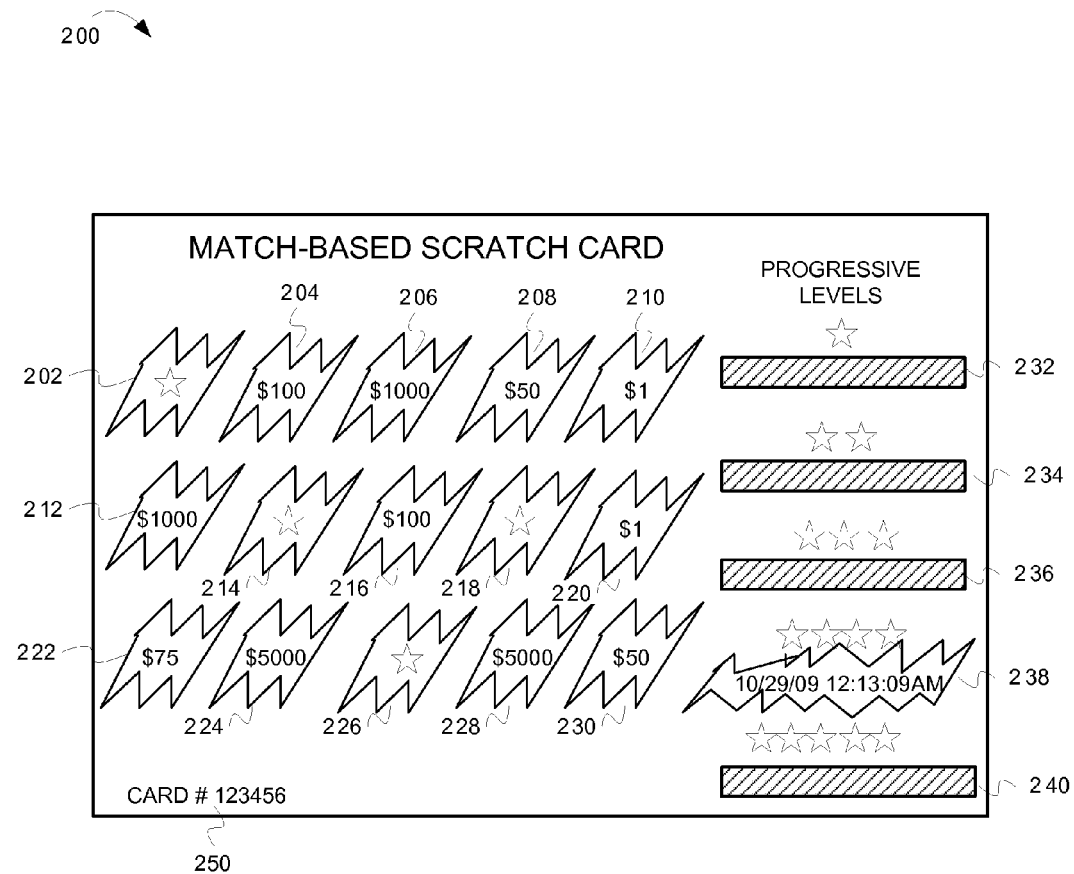
FIG. 3 illustrates the match-based scratch card of FIG. 2, after a player has played the scratch card, according to some example embodiments.
Figure 4:
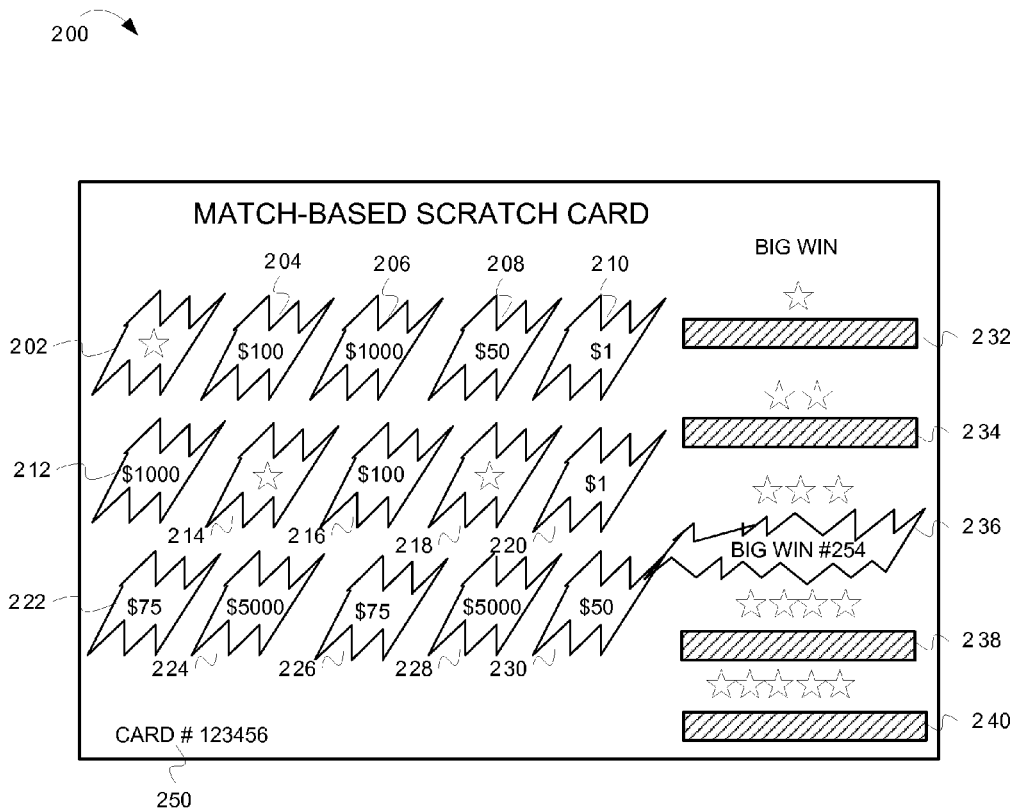
FIG. 4 illustrates the match-based scratch card of FIG. 2, after a player has played the scratch card, according to some other example embodiments.

FIGS. 3-4 illustrate two examples of a result of the scratch card 200 after boxes have been scratched off. In FIGS. 3 and 4, there are two different win identifiers associated with the number of stars revealed. In FIG. 3, the win identifier is a timestamp. In FIG. 4, the win identifier is a big win number.

FIG. 3 illustrates the match-based scratch card of FIG. 2, after a player has played the scratch card, according to some example embodiments. In particular, FIG. 3 illustrates the scratch card 200 after a player has exposed some or all of the hidden characters or graphics that reveal the result. In FIG. 3, the scratch card 200 is a matching game wherein three matches provide a prize. The matches are relative to the scratch-off boxes 202-230. Accordingly, if there is a match of three monetary amounts revealed behind the scratch-off boxes 202-230, a prize is won. Also, there is a prize if at least one star symbol is revealed. In this example, there can be one to five stars revealed. The star symbols are associated with a win identifier, wherein the player is required to input such identifier at the wagering game establishment as part of the redemption of the scratch card (as further described below). This star section includes a scratch-off box 232 for one star; a scratch-off box 234 for two stars; a scratch-off box 236 for three stars; a scratch-off box 238 for four stars; and a scratch-off box 240 for five stars. If at least one star is revealed in the scratch-off boxes 202-230, there is a prize awarded (scratch-off boxes 232-240).

In FIG. 3, all of the boxes 202-230 are scratched off. Each of the scratch-off boxes 202, 214, 218, and 226 reveal a star. The scratch-off boxes 204 and 216 reveal a monetary amount of $100. The scratch-off boxes 206 and 212 reveal a monetary amount of $1000. The scratch-off boxes 208 and 230 reveal a monetary amount of $50. The scratch-off boxes 210 and 220 reveal a monetary amount of $1. The scratch-off box 222 reveals a monetary amount of $75. The scratch-off boxes 224 and 228 reveal a monetary amount of $5000. In this example, because there were not three matches of a monetary amount, there is no win relative to a monetary amount. However, because at least one star was revealed, a win occurs based on the progressive levels. In this example, there were four stars revealed. Accordingly, the player scratches off the scratch-off box 238. For FIG. 3, the progressive levels reveal different timestamps. The scratch-off box 238 reveals a timestamp of Oct. 29, 2009 12:13:09 a.m.

Therefore for FIG. 3, the win identifier is a timestamp. The star symbols are associated with a progressive level jackpot game being played at the wagering game establishment 104. In particular, each of the number of star symbols is associated with a timestamp that determines the win value of the scratch card relative to the progressive level jackpot game. For example, the win value can be equal to the amount of the progressive level jackpot game at the particular time identified by the timestamp revealed on the scratch card. In some example embodiments, the scratch card can have a particular theme (e.g., Zeus), wherein the same theme is associated with a particular game having a progressive being played at the wagering game establishment 104. Accordingly, the reward value of the scratch card is equal to the amount of the progressive at the wagering game establishment at the time identified by the timestamp revealed on the scratch card. In some example embodiments, a player can redeem the scratch card at a wagering game machine (at a brick-and-mortar establishment) having the same theme as the scratch card. In addition to the progressive win, the player can unlock additional episodes, bonuses, extra spins, etc. at the wagering game machine. Alternatively or in addition, the scratch card can be themed to a particular brick-and-mortar wagering game establishment (e.g., "Casino A Scratch Card"). Therefore, if the player redeeming the scratch card is also a rewards member of the particular brick-and-mortar wagering game establishment, the player can also receive an award as part of player retention. For example, the additional award can be member points, a monetary amount, comps for a room, dining, etc.

FIG. 4 illustrates the match-based scratch card of FIG. 2, after a player has played the scratch card, according to some other example embodiments. In contrast to FIG. 3 that reveals timestamps for progressive levels for revealed stars, FIG. 4 assigns big win numbers to the revealed stars.

In FIG. 4, all of the boxes 202-230 are scratched off. In this example, each of the scratch-off boxes 202, 214, and 218 reveal a star. The scratch-off boxes 204 and 216 reveal a monetary amount of $100. The scratch-off boxes 206 and 212 reveal a monetary amount of $1000. The scratch-off boxes 208 and 230 reveal a monetary amount of $50. The scratch-off boxes 210 and 220 reveal a monetary amount of $1. The scratch-off boxes 222 and 226 reveal a monetary amount of $75. The scratch-off boxes 224 and 228 reveal a monetary amount of $5000. In this example, because there were not three matches of a monetary amount, there is no win relative to a monetary amount. However, because at least one star was revealed, a win occurs based on a big win. In this example, there were three stars revealed. Accordingly, the player scratches off the scratch-off box 236.

For FIG. 4, the big wins reveal different big win numbers. The scratch-off box 236 reveals a big win #254. The star symbols are associated with a big win that occurred at the wagering game establishment 104. The big win can be relative to all games or a particular game being played at the wagering game establishment 104.

For example, the scratch card can have a particular theme (e.g., Zeus), wherein the same theme is associated with a game being played at the wagering game establishment 104. In this example, if the big win number revealed on the scratch card is #254 for a Zeus themed scratch card, the wagering game establishment 104 determines the $254^{th}$ big win for the Zeus-themed game being played at the wagering game establishment 104. Therefore, the win value of the scratch card is equal to the amount of money won by the $254^{th}$ big win at the wagering game establishment 104.

In some example embodiments, a win is defined as a big win based on some multiple of the amount of the bet made. In particular, a win qualifies for a big win at the wagering game establishment 104 if the amount won is X (e.g., 25, 50, etc.) times greater than the amount of the bet. This association between a big win on the scratch card and a big win at the wagering game establishment can be for both or either online or brick-and-mortar. In some example embodiments, the big win can be the greater of the big win at the online wagering game establishment or the big win at the brick-and-mortar wagering game establishment. In some other example embodiments, the big win can be the combination of the big win at the online wagering game establishment and the big win at the brick-and-mortar wagering game establishment. The big win can be relative to the entire wagering game establishment 104 (instead of a particular themed game). Accordingly, if the scratch card reveals a big win number of 5000, the award of the scratch card is equal to the amount of money won by the $5000^{th}$ big win across any game at the wagering game establishment. In addition to revealing the award value for the associated big win, the wagering game establishment could reveal some or all of the other big wins. This could provide additional incentives to play again. For example, if the player won $500 for big win #254 and other big wins that are revealed are much higher (e.g., $10,000, $25,000, etc.), the player may want to try again to win the larger revealed amounts.

In some example embodiments, redemption of the scratch card 200 occurs at the wagering game establishment 104 (see scratch card redemptions 130-132 of FIG. 1). The redemption can be based on the scratch card number 250 and the win identifier (e.g., timestamp, big win number, three-match monetary amount, etc.).

Figure 5:
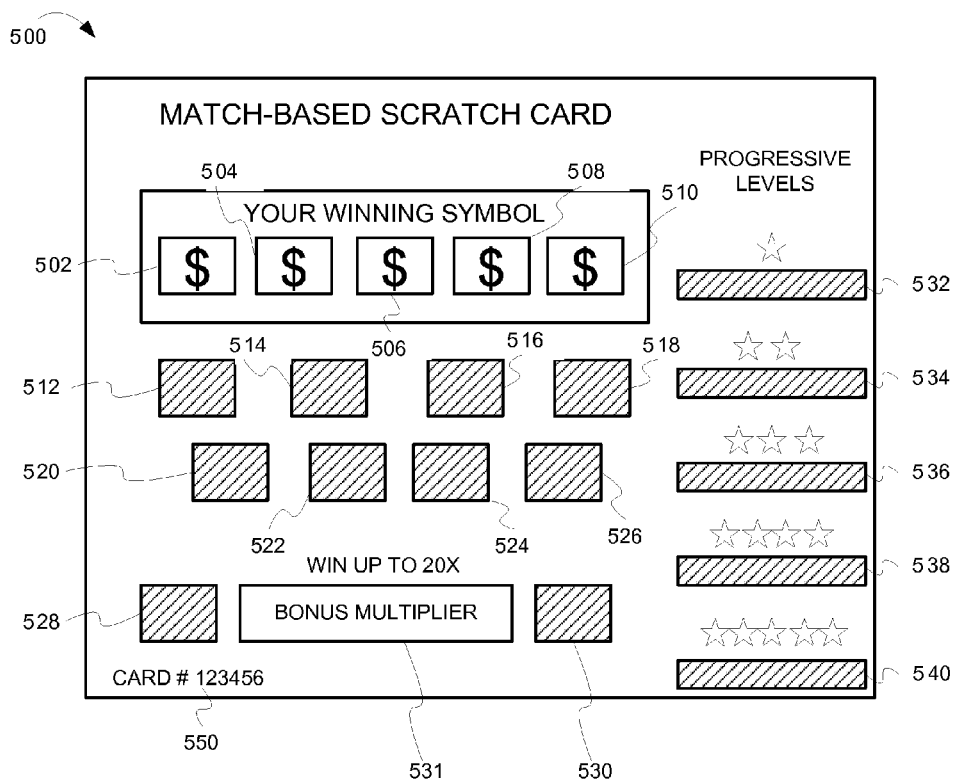
FIG. 5 illustrates an un-played match-based scratch card, according to some other example embodiments.

A different example match-based scratch card is now described with reference to FIGS. 5-6. FIG. 5 illustrates an un-played match-based scratch card, according to some other example embodiments. In particular, FIG. 5 illustrates a scratch card 500 wherein scratch-off has not yet occurred to reveal the result of play of the scratch card 500. The scratch card 500 includes scratch-off boxes 502-540 that have not yet been scratched-off to reveal the result. Similar to FIG. 2, for a physical scratch card, a film overlays the scratch-off boxes 502-540 to hide the characters or graphics. For an electronic scratch card, a graphic overlays the scratch-off boxes 502-540 to hide the characters or other graphics. For a physical scratch card, as a player rubs the overlaying film, the hidden characters or graphics are exposed. For an electronic scratch card, as a player provides input to remove the overlaying graphics, the hidden characters or graphics are exposed. These hidden characters or graphics indicate results of play of the scratch card 500. The scratch card 500 also includes a scratch card number 550.

Figure 6:
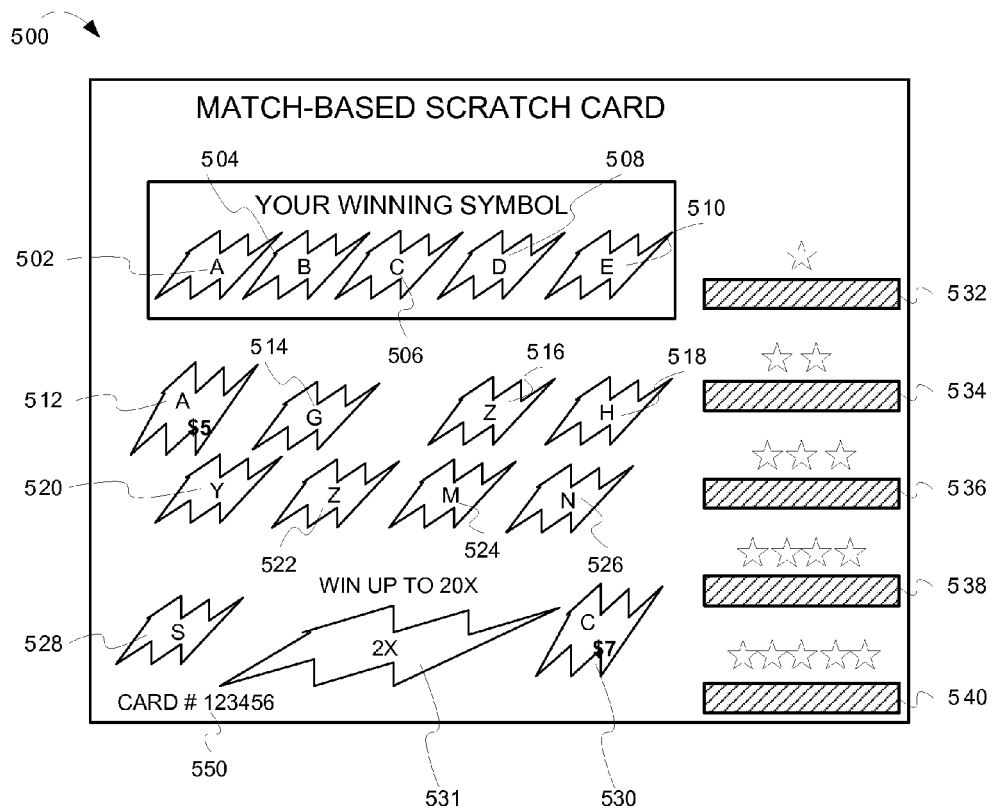
FIG. 6 illustrates the match-based scratch card of FIG. 5, after a player has played the scratch card, according to some example embodiments.

FIG. 6 illustrates the match-based scratch card of FIG. 5, after a player has played the scratch card, according to some example embodiments. In this example, a scratch card 500 includes a bonus multiplier 531, wherein the player can win up to 20 times their win. The scratch card 500 includes progressive levels similar to the scratch card 200 of FIG. 2. Also, for this example, one or more matches provide a win. The winning symbols are revealed from behind the scratch-off boxes 502-510. The scratch-off boxes 512-530 also reveal symbols. Any match between a revealed symbol in scratch-off boxes 502-510 and a revealed symbol in scratch-off boxes 512-530 provide a win.

In addition to the matching symbols revealed in scratch-off boxes 502-510, a win can occur if one or more symbols are a star (similar to the progressive levels of FIG. 3 and big wins of FIG. 4). These stars are associated with the section that includes scratch-off boxes 532-540. This section includes a scratch-off box 532 for one star; a scratch-off box 534 for two stars; a scratch-off box 536 for three stars; a scratch-off box 538 for four stars; and a scratch-off box 540 for five stars. If at least one star is revealed in the scratch-off boxes 512-530, there is a win using the progressive levels/big wins (scratch-off boxes 532-540).

All of the boxes 502-530 and 531 are scratched off. Each of the scratch-off boxes 502-510 reveals a winning symbol (scratch-off box 502—winning symbol A, scratch-off box 504—winning symbol B, scratch-off box 506—winning symbol C, scratch-off box 508—winning symbol D, and scratch-off box 510—winning symbol E). The symbols used in FIGS. 5-6 can be different types of symbols. In some applications, the symbols can be part of a theme for the scratch card 500. For example, the scratch card 500 can have a fishing theme wherein each of the symbols is a different type of fish on a hook.

The symbols behind the scratch-off boxes 512-530 are also revealed. If any of the symbols behind the scratch-off boxes 512-530 match any of the winning symbols, the scratch card 500 is a winning card. The scratch-off box 512 reveals a matching winning symbol—A (that provides a $5 win). The scratch-off box 514 reveals a non-matching symbol—G. The scratch-off boxes 516 and 522 reveal a non-matching symbol—Z. The scratch-off box 518 reveals a non-matching symbol—H. The scratch-off box 520 reveals a non-matching symbol—Y. The scratch-off box 524 reveals a non-matching symbol—M. The scratch-off box 526 reveals a non-matching symbol—N. The scratch-off box 528 reveals a non-matching symbol—S. The scratch-off box 530 reveals a matching winning symbol—C (that provides a $7 win). The bonus multiplier 531 provides a 2X multiplier. Accordingly, the scratch card 500 provides a $14 win (($2+$7)×2)). In this example, the scratch-off boxes 512-530 did not reveal any stars. Accordingly, there is no win using the scratch-off boxes 532-540. If any stars were revealed, the win can be based on the number of stars (similar to FIGS. 3 and 4).

In some example embodiments, redemption of the scratch card 500 occurs at the wagering game establishment 104 (see scratch card redemptions 130-132 of FIG. 1). The redemption can be based on the scratch card number 550, the winning symbol(s), the bonus multiplier 531, and the progressive levels/big wins (if applicable) (i.e., one or more stars revealed).

Figure 7:
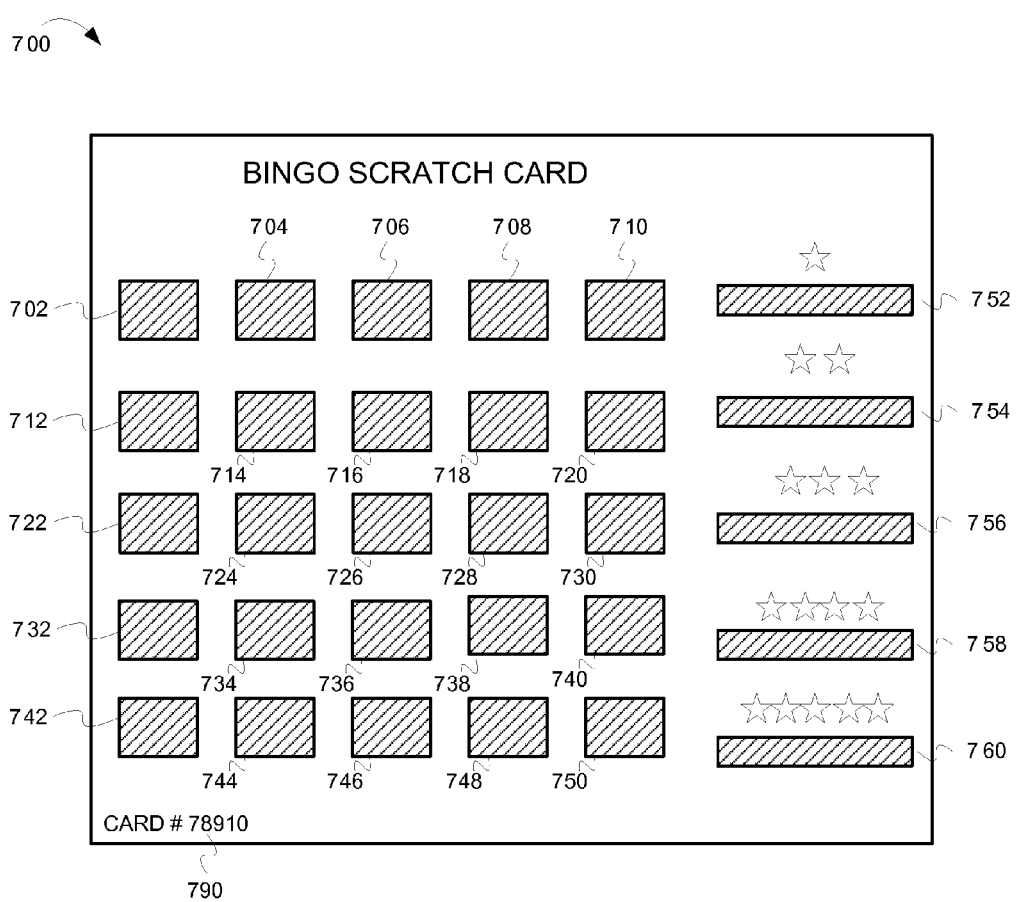
FIG. 7 illustrates an un-played progressive-based bingo scratch card, according to some example embodiments.

A bingo scratch card that having progressive gaming is now described with reference to FIGS. 7-8. FIG. 7 illustrates an un-played progressive-based bingo scratch card, according to some example embodiments. In particular, FIG. 7 illustrates a scratch card 700 wherein scratch-off has not yet occurred to reveal the result of play of the scratch card 700. The scratch card 700 includes scratch-off boxes 702-760 that have not yet been scratched-off to reveal the result. For example, for a physical scratch card, a film overlays the scratch-off boxes 702-760 to hide the characters or graphics. For an electronic scratch card, a graphic overlays the scratch-off boxes 702-760 to hide the characters or other graphics. For a physical scratch card, as a player rubs the overlaying film, the hidden characters or graphics are exposed. For an electronic scratch card, as a player provides input to remove the overlaying graphics, the hidden characters or graphics are exposed. These hidden characters or graphics indicate results of play of the scratch card 700. The scratch card 700 also includes a scratch card number 790.

Figure 8:
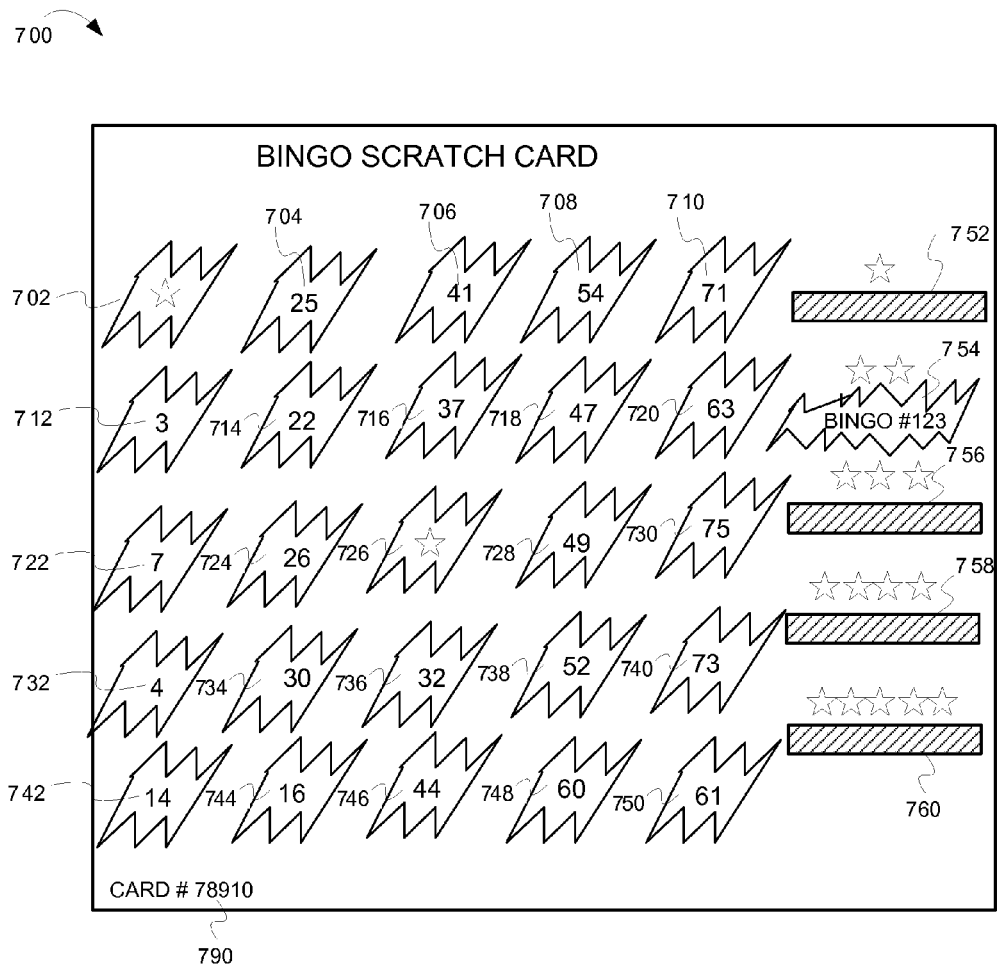
FIG. 8 illustrates the progressive-based bingo scratch card of FIG. 7, after a player has played the scratch card, according to some example embodiments.

FIG. 8 illustrates the progressive-based bingo scratch card of FIG. 7, after a player has played the scratch card, according to some example embodiments. In some example embodiments, the prize is based on all of the revealed bingo numbers or the revealed bingo numbers that are part of the winning pattern. For example, if the prize is based on the five numbers in a row revealed behind scratch-off boxes 710, 720, 730, 740 and 750, the payout can be some derivative of the revealed numbers (71 in the scratch-off box 710, 63 in the scratch-off box 720, 75 in the scratch-off box 730, 73 in the scratch-off box 740, and 61 in the scratch-off box 750). For example, the payout can be equal to the addition of these winning numbers (71+63+75+73+61=$343).

The scratch card 700 includes an additional option for winning a prize. Similar to FIG. 2, a star section is included (the scratch-off boxes 752-760). In some example embodiments, the star section is associated with a previous bingo win that occurred at the wagering game establishment 104. In particular, this section includes a scratch-off box 770 for one star; a scratch-off box 772 for two stars; a scratch-off box 774 for three stars; a scratch-off box 776 for four stars; and a scratch-off box 778 for five stars. If at least one star is revealed in the scratch-off boxes 702-750, there is a win using this section (scratch-off boxes 752-760) (similar to FIG. 3 described above). Each scratch-off box 752-760 can reveal a different bingo prize that was won at the wagering game establishment 104. For example, each scratch-off box 752-760 can reveal a bingo win number that is associated with a previous bingo win that has occurred at the wagering game establishment 104.

To illustrate, if the bingo win number revealed on the scratch card 700 is #500, the wagering game establishment 104 determines the 500$^{th}$ bingo win that occurred at the wagering game establishment 104.

This association between a bingo win on the scratch card and a bingo win at the wagering game establishment can be for both or either online or brick-and-mortar. In some example embodiments, the prize can be equal to the greater of the bingo win at the online wagering game establishment or the bingo win at the brick-and-mortar wagering game establishment. The bingo win at the brick-and-mortar wagering game establishment can be the 500$^{th}$ jackpot bingo win for a bingo-themed wagering game machine. In some other example embodiments, the prize can be the combination of the bingo win at the online wagering game establishment and the bingo win at the brick-and-mortar wagering game establishment. In addition to revealing the prize value for the associated bingo win, the wagering game establishment 104 could reveal some or all of the other bingo wins. This could provide additional incentives to play again. For example, if the player won $25 for bingo win #500 and other bingo wins that are revealed are much higher (e.g., $5,000, $25,000, etc.), the player may want to try again to win the larger revealed amounts.

In some example embodiments, redemption of the scratch card 700 occurs at the wagering game establishment 104 (see scratch card redemptions 130-132 of FIG. 1). The player can input the scratch card number 760, each of the bingo numbers revealed (behind scratch-off boxes 702-750, and the bingo number (e.g., scratch-off box 756), if the win is based on the one or more stars revealed. The wagering game establishment 104 can then locate the particular bingo card and then display what the bingo card pays. The award can range from no prize to a possible jackpot bingo win. In some example embodiments, the wagering game establishment 104 can multiply the amount of the prize by how many winning bingo cards that are paid by the player. For example, assume that the player is playing five bingo cards. Also, assume that two out of five bingo cards are winners and that the prize for the two cards together equal $5. Since the number of winning cards is two, the payout is multiplied by two, for a total win of $10 (2×$5).

In some example embodiments, the bingo scratch card is reusable. For example, the scratch card can be electronic, wherein the wagering game establishment 104 can redefine the scratch-off boxes to reveal different bingo numbers. This redefinition can occur periodically (once a day, once an hour, each time a player pays, etc.). The player can customize their reusable scratch card (e.g., different skins, different backgrounds, etc.). For example, the player can import an image to be the background of the scratch card. The player would pay to reveal the bingo numbers behind the redefined scratch-off boxes. Such a configuration would encourage the player to revisit the wagering game establishment 104.

Figure 9:
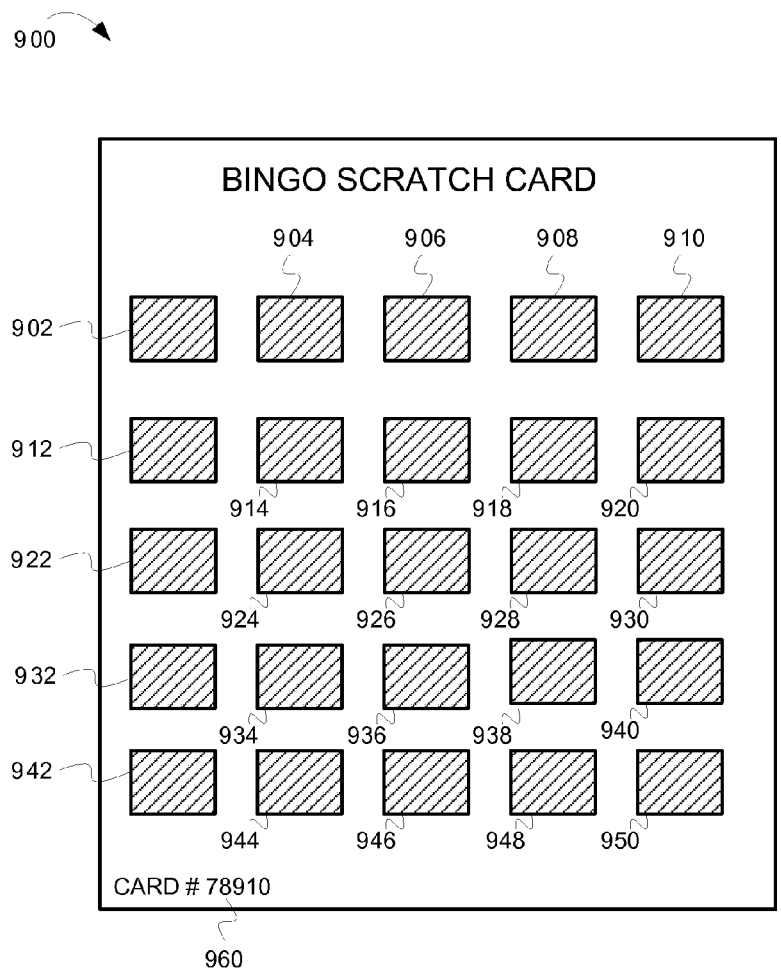
FIG. 9 illustrates an un-played bingo scratch card (not including progressive gaming), according to some example embodiments.

A bingo scratch card that does not include progressive gaming is now described with reference to FIGS. 9-10. FIG. 9 illustrates an un-played bingo scratch card (not including progressive gaming), according to some example embodiments. In particular, FIG. 9 illustrates a scratch card 900 wherein scratch-off has not yet occurred to reveal the result of play of the scratch card 900. The scratch card 900 includes scratch-off boxes 902-950 that have not yet been scratched-off to reveal the result. Similar to FIG. 2, for a physical scratch card, a film overlays the scratch-off boxes 902-950 to hide the characters or graphics. For an electronic scratch card, a graphic overlays the scratch-off boxes 902-950 to hide the characters or other graphics. For a physical scratch card, as a player rubs the overlaying film, the hidden characters or graphics are exposed. For an electronic scratch card, as a player provides input to remove the overlaying graphics, the hidden characters or graphics are exposed. These hidden characters or graphics indicate results of play of the scratch card 900. The scratch card 900 also includes a scratch card number 960.

Figure 10:
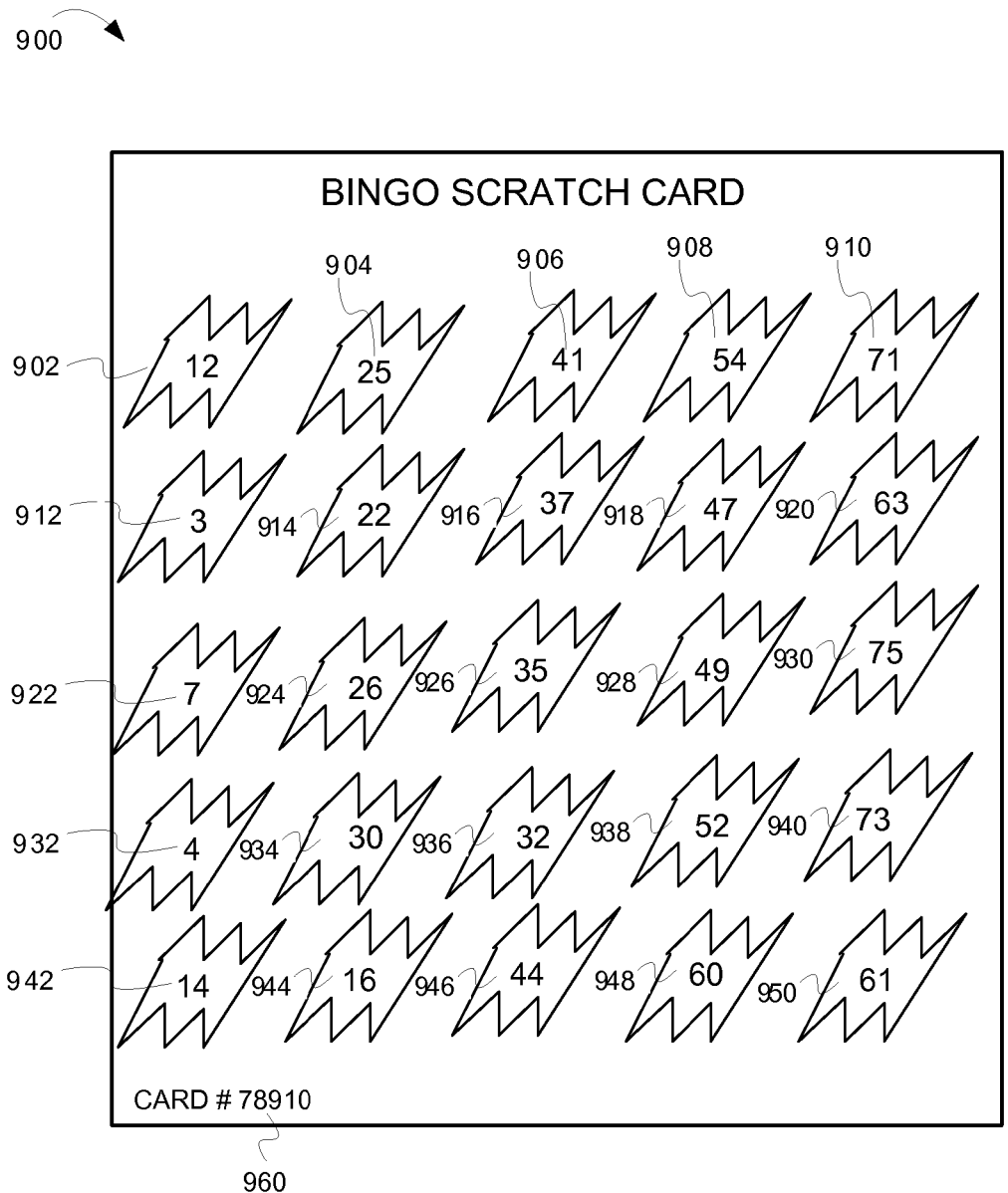
FIG. 10 illustrates the bingo scratch card of FIG. 9, after a player has played the scratch card, according to some example embodiments.

FIG. 10 illustrates the bingo scratch card of FIG. 9, after a player has played the scratch card, according to some example embodiments. In some example embodiments, redemption of the scratch card 900 occurs at the wagering game establishment 104 (see scratch card redemptions 130-132 of FIG. 1). The player can input the scratch card number 960, and each of the bingo numbers revealed (behind scratch-off boxes 902-950. The wagering game establishment 104 can then locate the particular bingo card and then display what the bingo card pays.

In some example embodiments, the prize is based on all of the revealed bingo numbers or the revealed bingo numbers that are part of the winning pattern. For example, if the prize is based on the five numbers in a row revealed behind scratch-off boxes 902, 912, 922, 932 and 942, the payout can be some derivative of the revealed numbers (12 in the scratch-off box 902, 3 in the scratch-off box 912, 7 in the scratch-off box 922, 4 in the scratch-off box 932, and 14 in the scratch-off box 942). For example, the prize can be equal to two times the addition of these winning numbers (2×(12+3+7+4+14)=$80). Similar to above, the bingo cards can be specifically themed or just overall bingo cards. In some example embodiments, the wagering game establishment 104 can multiply the amount of the prize by how many winning bingo cards that are paid by the player. For example, assume that two out of five bingo cards are winners and that the prize for the two cards together equal $10. Since the number of winning cards is two, the prize is multiplied by two, for a total win of $20 (2× $10). Similar to the scratch card 700, the bingo scratch card can be reusable.

Figure 11:
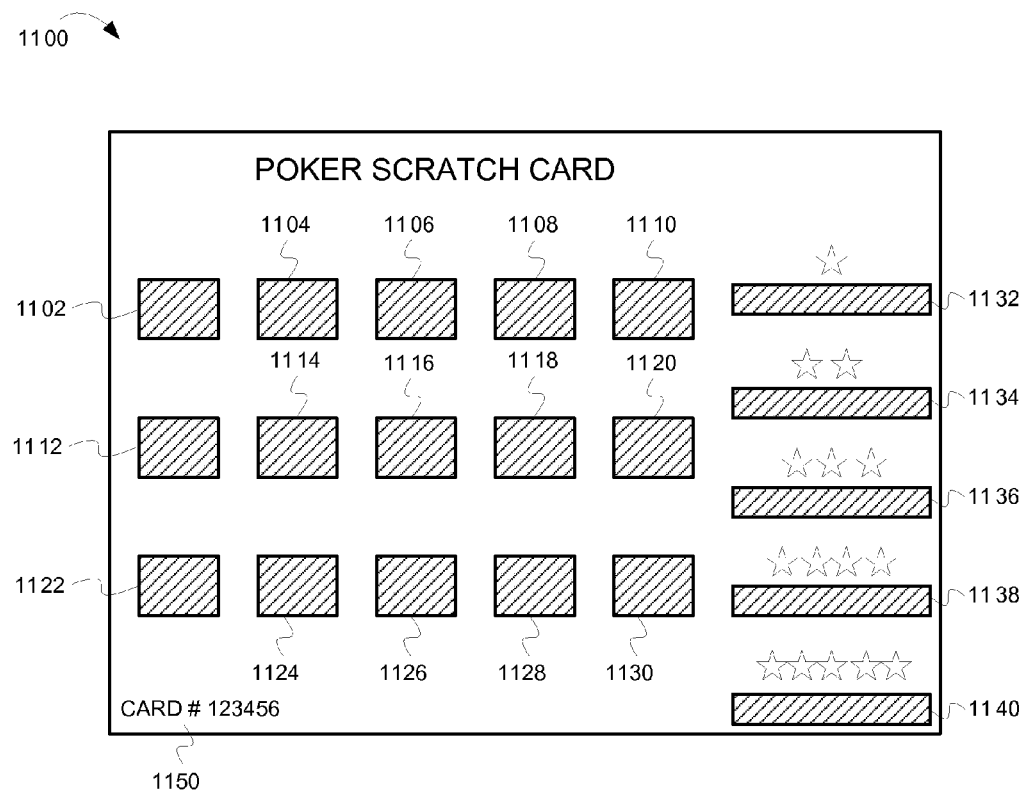
FIG. 11 illustrates an un-played progressive-based poker scratch card, according to some example embodiments.

A progressive-based poker scratch card is now described with reference to FIGS. 11-12. FIG. 11 illustrates an un-played progressive-based poker scratch card, according to some example embodiments. In particular, FIG. 11 illustrates a scratch card 1100 wherein scratch-off has not yet occurred to reveal the result of play of the scratch card 1100. The scratch card 1100 includes scratch-off boxes 1102-1140 that have not yet been scratched-off to reveal the result. Similar to FIG. 2, for a physical scratch card, a film overlays the scratch-off boxes 1102-1140 to hide the characters or graphics. For an electronic scratch card, a graphic overlays the scratch-off boxes 1102-1140 to hide the characters or other graphics. For a physical scratch card, as a player rubs the overlaying film, the hidden characters or graphics are exposed. For an electronic scratch card, as a player provides input to remove the overlaying graphics, the hidden characters or graphics are exposed. These hidden characters or graphics indicate results of play of the scratch card 1100. The scratch card 1100 also includes a scratch card number 1150.

Figure 12:
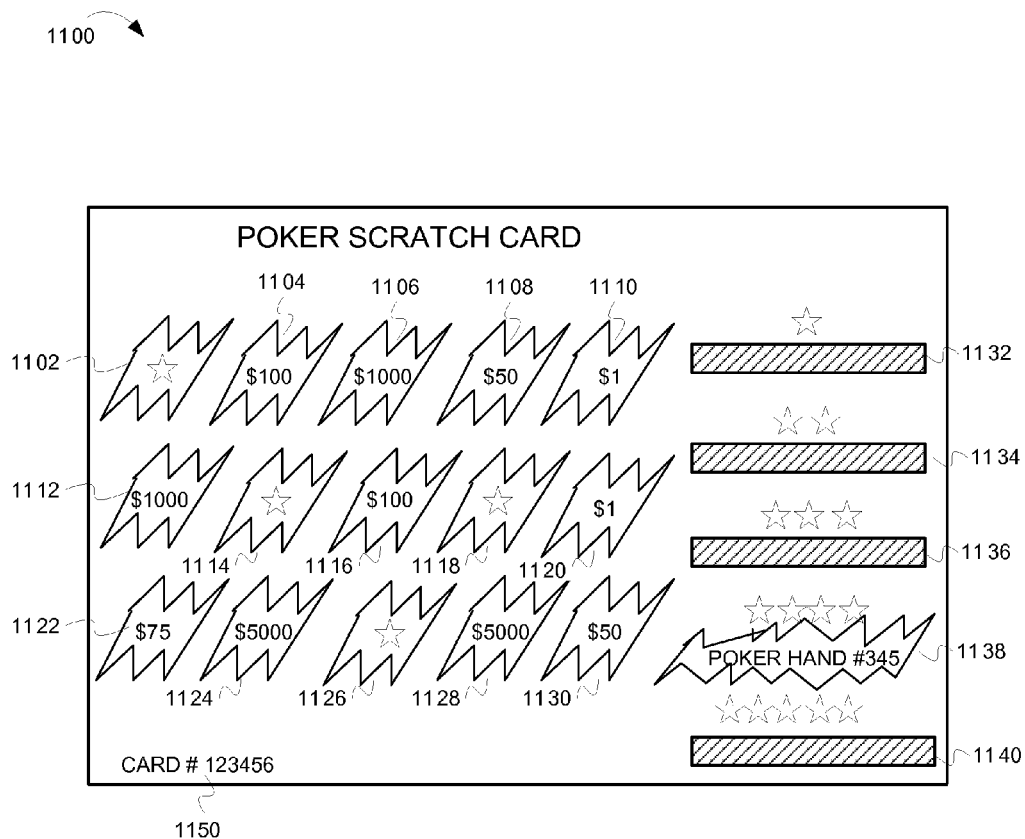
FIG. 12 illustrates the progressive-based poker scratch card of FIG. 11 after a player has played the scratch card, according to some example embodiments.

FIG. 12 illustrates the progressive-based poker scratch card of FIG. 11 after a player has played the scratch card, according to some example embodiments. In particular, FIG. 12 illustrates the scratch card 1100 after a player has exposed some or all of the hidden characters or graphics that reveal the result. The scratch card 1100 is a matching game wherein three matches provide a prize. The matches are relative to the scratch-off boxes 1102-1130. Accordingly, if there is a match of three monetary amounts revealed behind the scratch-off boxes 1102-1130, a prize is won.

The scratch card 1100 includes an additional option for winning a prize. Similar to FIG. 2, a star section is included (the scratch-off boxes 1132-1140). In this example, instead of monetary amounts, the scratch-off boxes 1102-1130 can reveal one to five stars. This star section includes a scratch-off box 1132 for one star; a scratch-off box 1134 for two stars; a scratch-off box 1136 for three stars; a scratch-off box 1138 for four stars; and a scratch-off box 1140 for five stars. If at least one star is revealed in the scratch-off boxes 1102-1130, the wagering game establishment 104 awards a prize using this section (scratch-off boxes 1132-1140).

In this example, all of the scratch-off boxes 1102-1130 are scratched off. Each of the scratch-off boxes 1102, 1114, 1118, and 1126 reveal a star. The scratch-off boxes 1104 and 1116 reveal a monetary amount of $100. The scratch-off boxes 1106 and 1112 reveal a monetary amount of $1000. The scratch-off boxes 1108 and 1130 reveal a monetary amount of $50. The scratch-off boxes 1110 and 1120 reveal a monetary amount of $1. The scratch-off box 1122 reveals a monetary amount of $75. The scratch-off boxes 1124 and 1128 reveal a monetary amount of $5000. In this example, because there were not three matches of a monetary amount, there is no win relative to a monetary amount. However, because at least one star was revealed, a prize is awarded based on the number of stars.

In some example embodiments, redemption of the scratch card occurs at the wagering game establishment 104 (see scratch card redemptions 130-132 of FIG. 1). The redemption can be based on the scratch card number 1150 and the poker hand number (e.g., scratch-off box 1138), if the win is based on the number of stars (i.e., one or more stars revealed). The wagering game establishment 104 could assign different prizes to different poker hand numbers. For example, a poker hand #345 would yield a prize equal to a royal flush, while a poker hand number #456 would yield a prize equal to a full house. The number of stars on the scratch card 1100 would determine how likely the player would be awarded a royal flush hand. For example, one star would yield a slim chance of that poker hand being a royal flush, while five stars would have a very good chance of returning a royal flush hand. In some example embodiments, a certain number of stars would guarantee a given level of a poker hand. For example, five stars would guarantee the player at least a four of a kind. Similar to the scratch cards described above, the scratch card poke game can be associated with a specific theme or a specific brick-and-mortar wagering game establishment. For example, the scratch card can be associated with a specific video poker wagering game machine, wherein the scratch card can be redeemed at such a wagering game machine (as described above).

Figure 13:
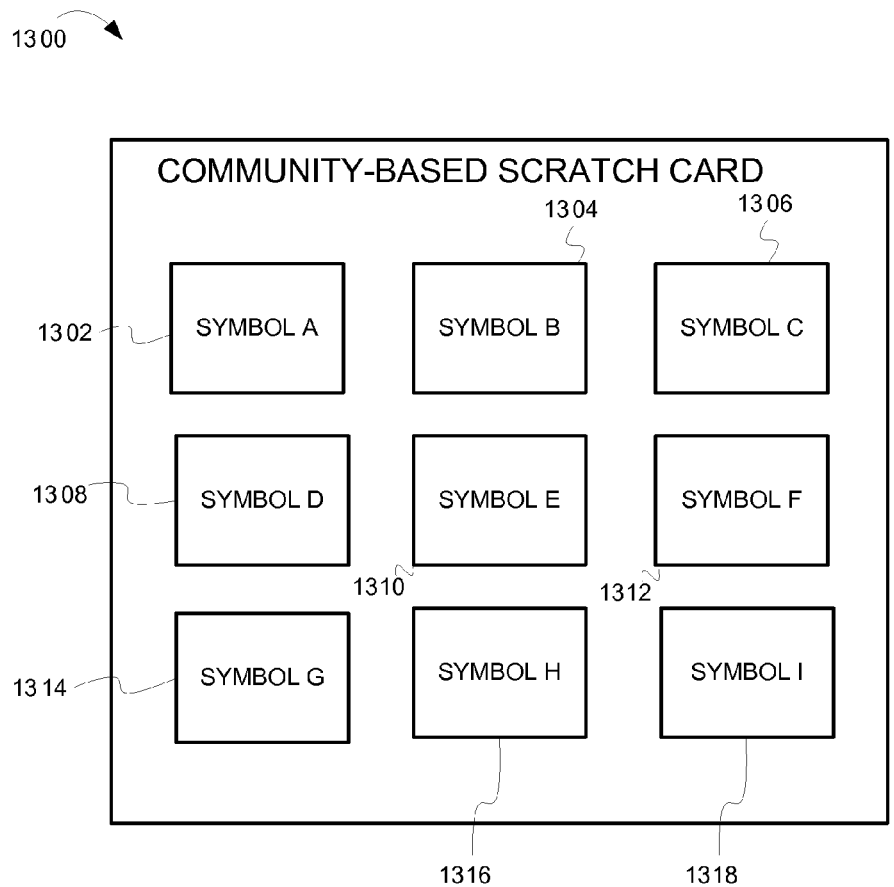
FIG. 13 illustrates an un-played community scratch card, according to some example embodiments.

A community scratch card is now described with reference to FIGS. 13-16. FIG. 13 illustrates an un-played community scratch card, according to some example embodiments. The community scratch card 1300 can be played at an online wagering game establishment, wherein a number of persons are part of a same scratch card. In this example, each person is assigned a symbol, wherein each symbol is assigned a box on the community scratch card. The symbols can be monetary amounts ($500, $25, etc.), particular cards in a deck of cards (ace of hearts, king of spades, etc.), different types of animals, different types of cars, different cities, etc. Persons can enter the community scratch card 1300 by inputting a given monetary amount at the online wagering game establishment.

In this example, there are nine persons playing—each associated with a different box on the community scratch card 1300. A box 1302 includes a symbol A; a box 1304 includes a symbol B; a box 1306 includes a symbol C; a box 1308 includes a symbol D; a box 1310 includes a symbol E; a box 1312 includes a symbol F; a box 1314 includes a symbol G; a box 1316 includes a symbol H; and a box 1318 includes a symbol I. Each person knows their symbol, but does not know the symbols of the other persons. As shown initially no persons are revealed. In some example embodiments, a player can join a bank for playing a community scratch card. Once enough players are in the bank, play can commence.

Figure 14:
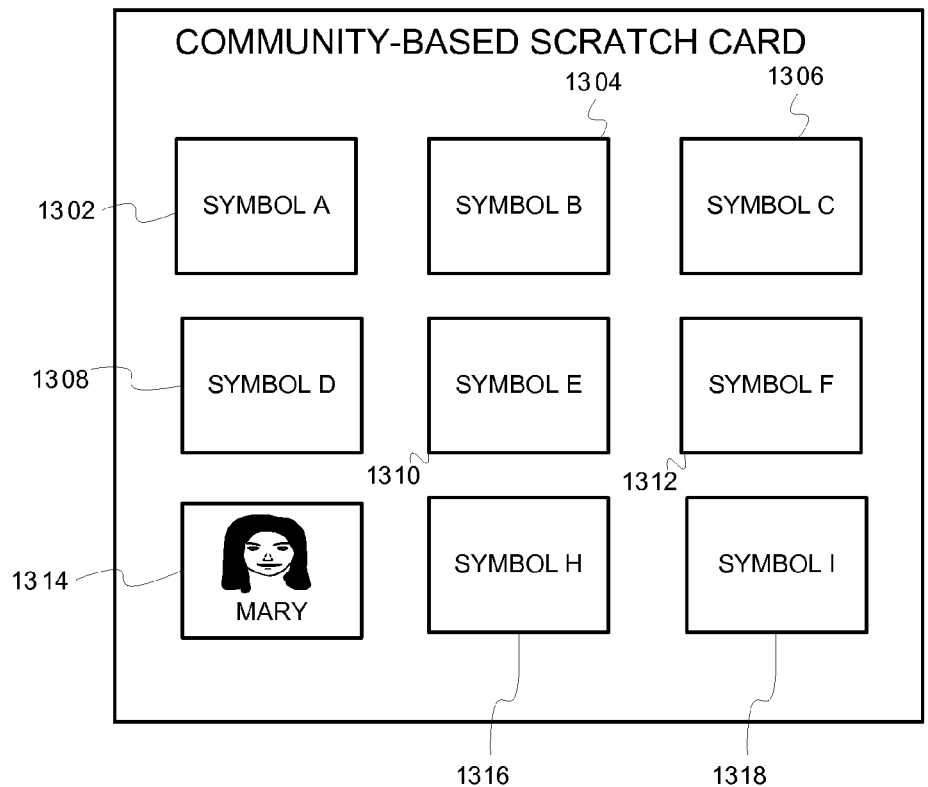
FIG. 14 illustrates the community scratch card of FIG. 13 after a first player selection, according to some example embodiments.

FIG. 14 illustrates the community scratch card of FIG. 13 after a first player selection, according to some example embodiments. There is one person who is considered the jackpot person, who is unknown to the persons playing. The person that selects the jackpot person is considered the winner of the game. Alternatively or in addition, the player selecting a winning box is considered the winner of the game. The payout can be a monetary amount, advancement to a higher level community scratch card for a larger monetary amount, etc.

A randomly selected person can begin a selection of one of the symbols. With reference to FIG. 14, a first person selected the symbol G in the box 1314. Mary was behind the symbol G. In some example embodiments, the person selected (e.g., Mary) can make the next selection. Alternatively, a next randomly selected person can make the next selection. In some example embodiments, players can trade or sell picks to other players in the game. In some example embodiments, players can pass on picking to the next player to make a selection. Players who make successful picks earn a greater payback.

Figure 15:
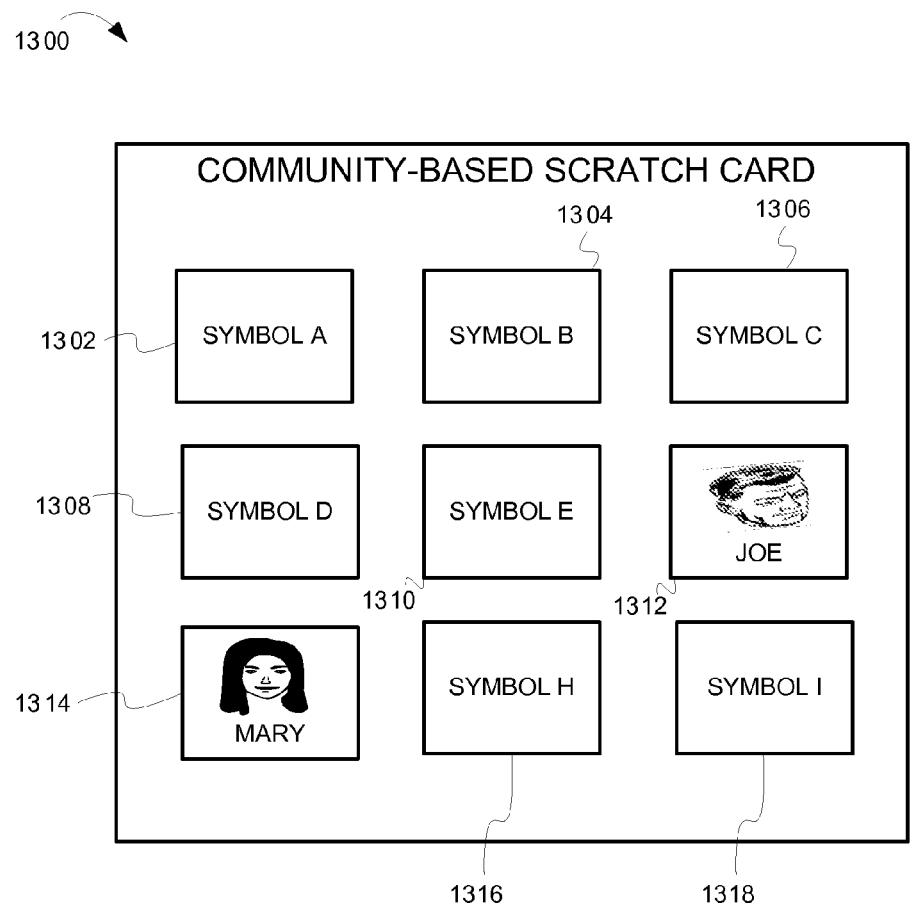
FIG. 15 illustrates the community scratch card of FIG. 13 after a second player selection, according to some example embodiments.

FIG. 15 illustrates the community scratch card of FIG. 13 after a second player selection, according to some example embodiments. A next person selected the symbol F in the box 1312. Joe was behind the symbol F. This selection process continues until all persons are revealed.

Figure 16:
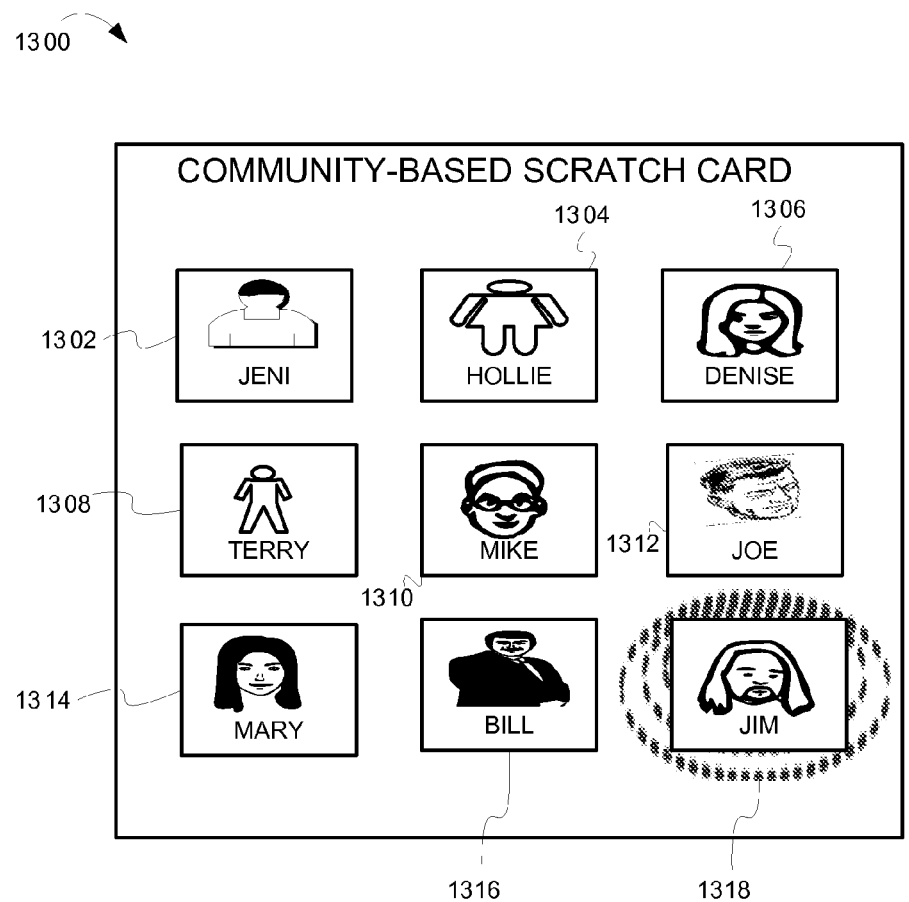
FIG. 16 illustrates the community scratch card of FIG. 13 after completion and all players have been selected, according to some example embodiments.

FIG. 16 illustrates the community scratch card of FIG. 13 after completion and all players have been selected, according to some example embodiments. In this example, Jim is the jackpot person behind the symbol I in the box 1318. The revealing of the jackpot person can be made after all persons are revealed. In some example embodiments, as a particular person is revealed, this person can be part of a community chat to allow the game to be more interactive among the players.

In some example embodiments, a player can earn a prize if they recruit another player to play in their community scratch card game. Such prizes can include multipliers associated prizes that are won during the community scratch card game, extra bonus money usable for play at the online wagering game establishment, etc. In some example embodiments, the more players that are playing the community scratch card, the higher the payout for the community scratch card.

In some example embodiments, the community scratch cards can occur at non-wagering online sites, wherein sweepstakes or bonus money is awarded as payouts. Such sweepstakes or bonus money is then only usable at the wagering game establishment.

In some example embodiments, each player's avatar or image is initially shown at the start of the game on some part of the display that is not showing the community scratch card. For example, the avatars or images can be displayed on around the community scratch card. In some example embodiments, the players can communicate with each over via a chat. In some example embodiments, all of the players can see the cursor movement of a player making the current pick. The other players can encourage or discourage a current selection by a player based on the cursor movement. If a selection provides a prize, the prize can be shown below the player's avatar. In some example embodiments, there can be secondary games (such as word/letter guessing games, trivia contest on timers, etc.)

Example Operations

This section describes operations associated with some example embodiments. In the discussion below, the flowcharts are described with reference to the block diagrams presented above. However, in some example embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

The section describes FIGS. 17-20. The discussion of FIG. 17 describes operations for driving wagering game traffic using social networking. The discussion of FIG. 18-19 describes operations for determining referral rewards for a referrer through the social networking. The discussion of FIG. 20 describes operations for driving wagering game traffic through scratch card redemption at the wagering game establishment. In some example embodiments, components of the wagering game establishment 104 perform the operations described in FIGS. 17-20. For example, if the wagering game establishment is an online wagering game web site, a module (e.g., software) executing at the web site can perform the operations. If the wagering game establishment is brick-and-mortar, a module within a device at the wagering game establishment can perform the operations. For example, a module executing in a wagering game machine, a module executing in some type of redemption machine, etc. performs the operations. An example architecture including such a module is described below in conjunction FIG. 21. For purposes of the description of FIGS. 17-20, the term "module" is used to describe the component performing the operations.

Figure 17:
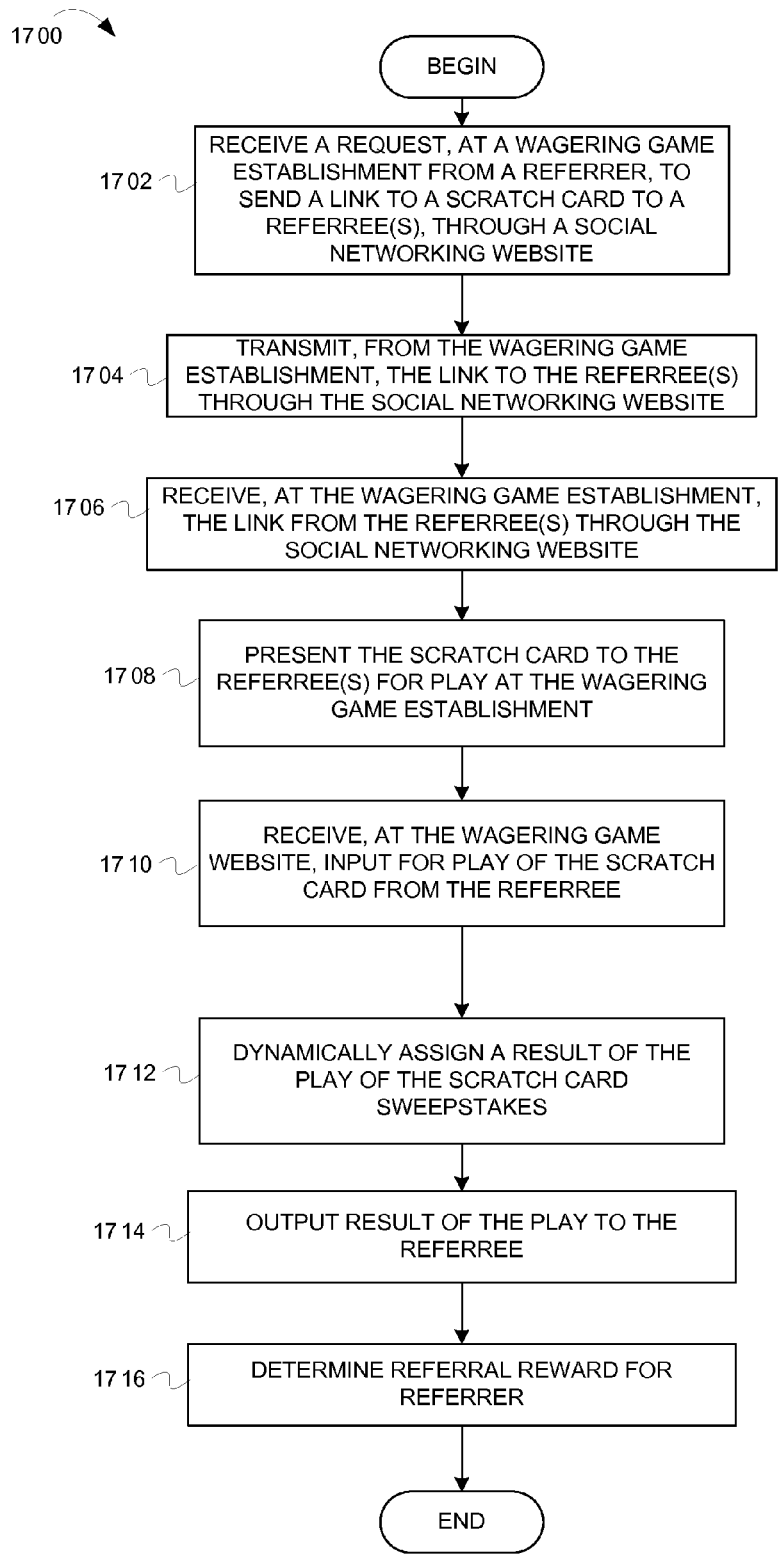
FIG. 17 is a flowchart of operations for increasing wagering game traffic through social networking and using scratch cards, according to some example embodiments.

FIG. 17 is a flowchart of operations for increasing wagering game traffic through social networking and using scratch cards, according to some example embodiments. The flowchart 1700 is in reference to electronic scratch cards. The operations of the flowchart 1700 begin at block 1702.

At block 1702, the module receives a request, at a wagering game establishment from a referrer, to send a link to a scratch card to at least one referree through a social networking website. With reference to FIG. 1, a module executing at the wagering game establishment 104 receives a request from the referrer 106 (see the friend referral 116). The referrees can be friends of the referrer within the social networking website 102. The scratch game can be a free game that enables a player to win bonus money. In some example embodiments, the free game play is limited. In particular, the module can limit the number of free game plays based on the email address or user account associated with the referree at the social networking website 102. For example, the limit can be one free game play per email address.

In some example embodiments, the referrer 106 is a member of the wagering game establishment 104. The referrer 106 can send invites through the wagering game establishment 104 using a number of different methods. For example, a member can send the invites using a "share this" icon sharing menu within their member account. In another example, strategically placed banner promotions at the wagering game establishment 104 can invite members to become referrers. Accordingly, if the banner promotion is selected, the member can send invites by inputting the account information (e.g., email address) for the referrees at the wagering game establishment 104. In another example, a member can have a "my stuff" page that can contain a section for "my referrals." The member can send invites by selecting a link in the section of "my referrals." Accordingly, if the link in this section is selected, the member can send invites by inputting the account information for the referrees at the wagering game establishment 104.

In some example embodiments, the module tracks how many referrees receive links from a given referrer. The module can also track the identification of the referrees. Accordingly, the module can limit the total number of links transmitted by a given referrer. The module can also limit one game play for a given referree from a given referrer.

Alternatively or in addition to sending a request to the module at the wagering game establishment 104, the referrer 106 can post an invite to play a scratch card on their own wall within the social network website 102. The referrer 106 can also send private messages to their friends on the social network website 102. The private messages can include the link for game play. The operations of the flowchart 1700 continue at block 1704.

At block 1704, the module transmits, from the wagering game establishment, the link to the referree(s) through the social networking website. With reference to FIG. 1, the module executing at the wagering game establishment 104 transmits the link 118 to the friend A 108 and transmits the link 122 to the friend N 110. The links 118 and 122 can be hyperlinks that after being selected initiate play of a scratch card. In some example embodiments, the links 118 and 122 comprise unique codes that enable one time play of a scratch card. In other words, the links 118 and 122 are not reusable. Also, in some example embodiments, the links 118 and 122 are not transferable to a different account. Specifically, the links 118 and 122 are associated with a single user account at the social network website 102. An explicit request by the referrer 106 can cause the transmitting of the link. Alternatively or in addition, the transmitting of the link can be in response to a friend selecting the invite from the wall of the referrer on their wall within the social networking website 102 or from a private message send through the social networking website 102. The operations of the flowchart 1700 continue at block 1706.

At block 1706, the module receives at the wagering game establishment, the link from the referree(s) through the social network website. With reference to FIG. 1, the module at the wagering game establishment 104 receives the link 120 from the referree 108 and the link 124 from the referree 108 110. The transmitting of the links 120 and 124 are the initiation of play of the scratch card. The operations of the flowchart 1700 continue at block 1708.

At block 1708, the module presents the scratch card to the referree(s) for play at the wagering game establishment. In some example embodiments, the wagering game establishment 104 hosts the scratch card, wherein the display of game play is provided within the social networking website 102. For example, some type of multimedia platform (e.g., Adobe Flash) can be used to display the game play within the social networking website 102. The module at the wagering game establishment 104 can still control the game play, providing display commands over a network to the social network website 102, etc. Alternatively or in addition to having display of the game play through the social network website 102, a toolbar on a Graphical User Interface (GUI) that is displaying a website can be used for play of the scratch card. The toolbar can present the scratch card to enable a referree to play the scratch card therein. Game play of the scratch cards using the toolbar can be limited to when the referree is logged in and displaying the social network website 102. In particular, the toolbar application can determine whether a current website being displayed is the social network website 102. If not installed, the referree can be given the option of installing the toolbar for scratch card play. This option can be given after the referree selects the link to play the scratch card. The operations of the flowchart 1700 continue at block 1710.

At block 1710, the module receives, at the wagering game establishment, input for play of the scratch card from the referree. For play of an electronic scratch card, the module can receive the selection of which scratch-off boxes to scratch off (see examples of the scratch cards in FIGS. 2-16). The operations of the flowchart 1700 continue at 1712.

At block 1712, the module dynamically assigns a result of the play of the scratch card. In particular, the module can dynamically determine whether the result of play of the scratch card is a win or loss. Also, the module can dynamically determine the amount of the prize. In some example embodiments, the prize is a bonus monetary amount. The bonus monetary amount is only usable at the wagering game establishment. It is non-usable external to the wagering game establishment. Examples uses of the bonus monetary amount can include playing other scratch cards for additional bonus monies, playing different types of wagering games (e.g., poker, slot machines, blackjack, etc.), an entry into the sweepstakes, etc. In some example embodiments, a dynamic assigning of a result comprises a determination of the result that is randomly made. The dynamic determinations can have predefined limits of win levels, total bonus monies that are won within a defined period, total wins for a given bonus monetary amount, etc. The operations of the flowchart 1700 continue at block 1714.

At block 1714, the module outputs the result of the play to the referree. The module can output a message that is displayed to the referree, indicating a loss, a win and the amount won. The message can also provide instructions on how the bonus money can be used, links to redeem the bonus money for use within the wagering game establishment, etc. The message can also provide an invitation for the referree to become a member of the wagering game establishment, the benefits of doing so, etc. The operations of the flowchart 1700 continue at block 1716.

At block 1716, the module determines a referral reward for the referrer. A more detailed description of this determination according to some example embodiments is set forth in the description of FIGS. 18-19 (described below). The operations of the flowchart 1700 are complete.

Figure 18:
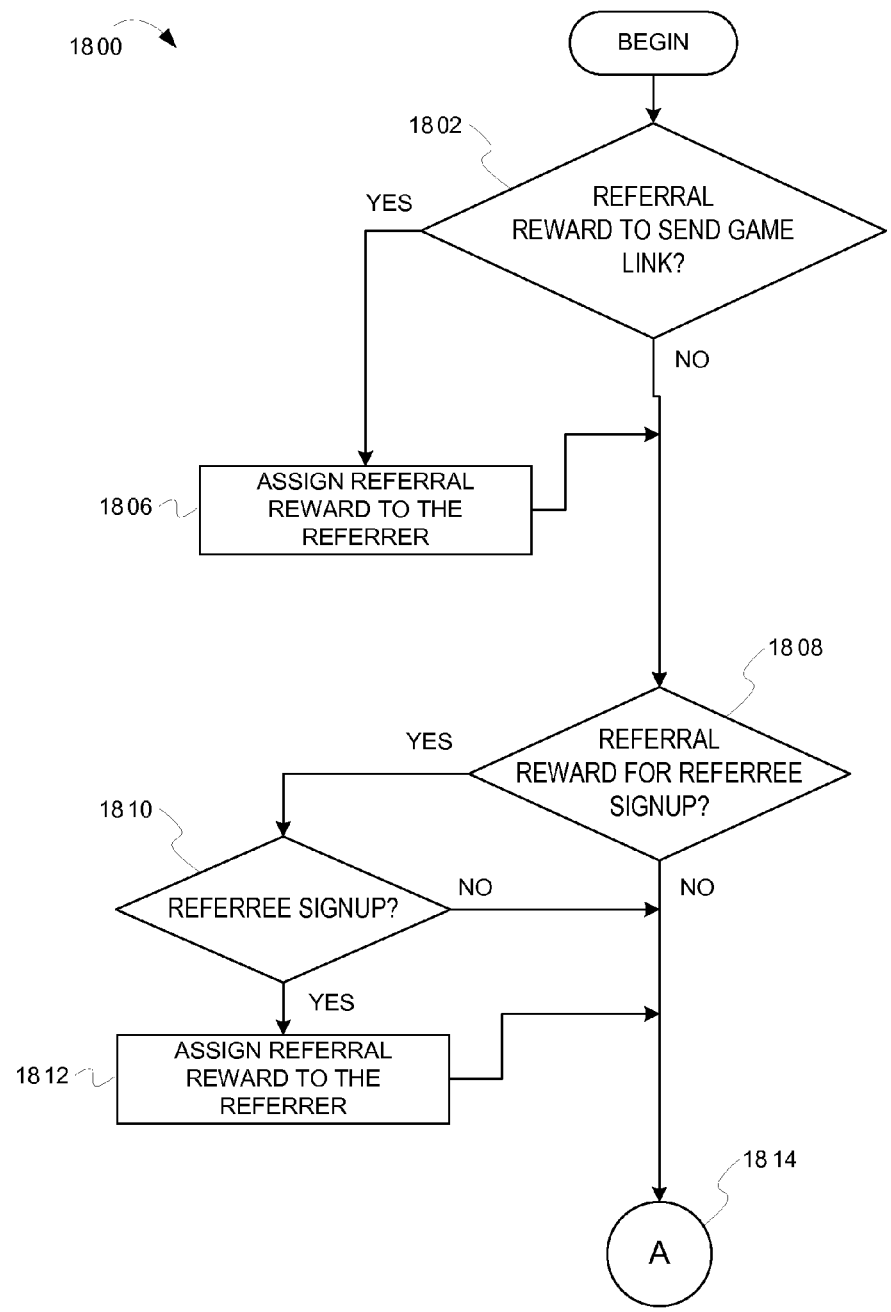
FIGS. 18-19 are flowcharts of operations for determining referral rewards for a referrer, according to some example embodiments.
Figure 19:
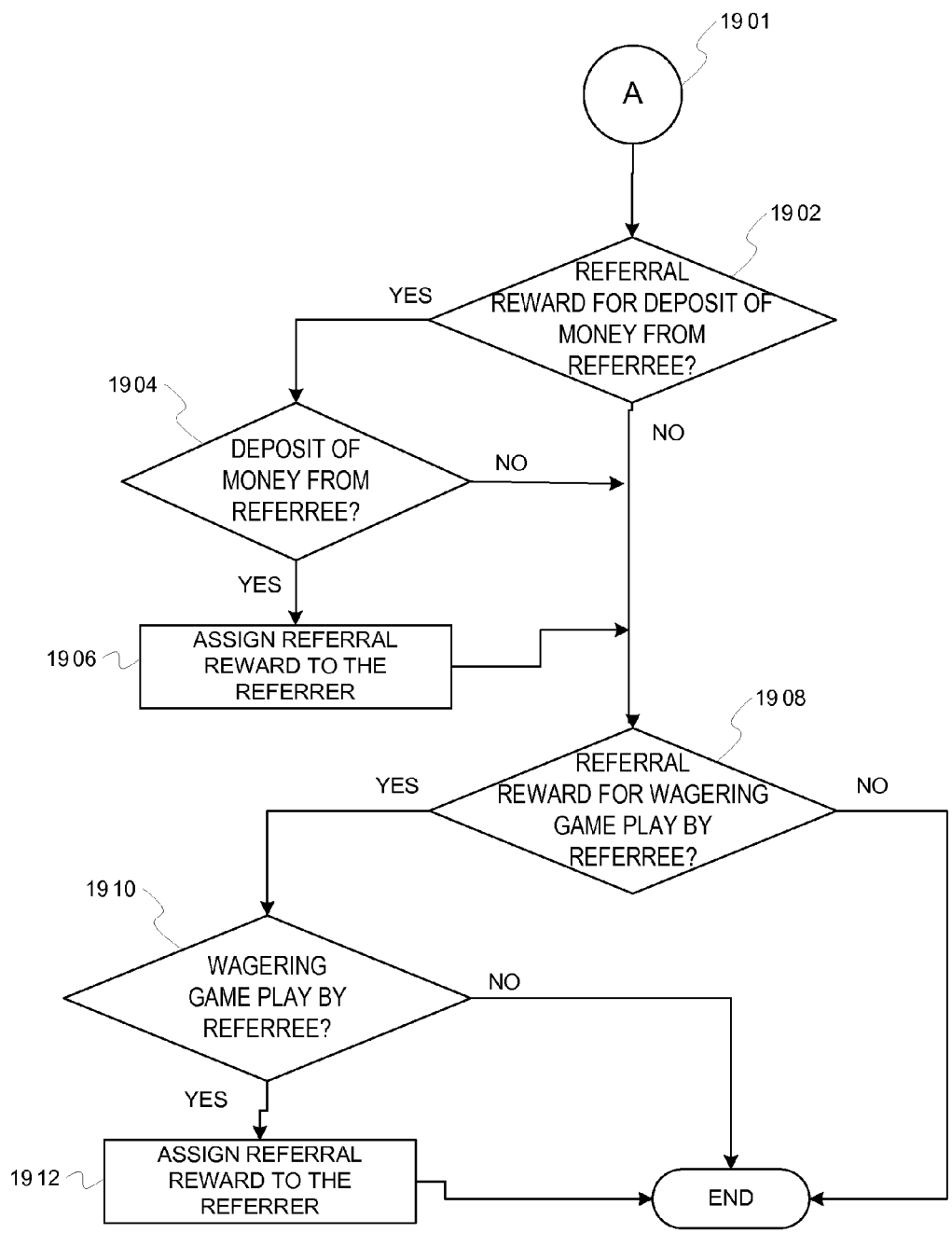

FIGS. 18-19 are flowcharts of operations for determining referral rewards for a referrer, according to some example embodiments. The operations of the flowchart 1800 begin at block 1802. The flowchart 1900 of FIG. 18 is a continuation of the operations of the flowchart 1800 of FIG. 18, wherein point A (1814 and 1901) is the transition between the two.

At block 1802, the module at the wagering game establishment determines whether there is a referral reward for sending a game link. For example, a reward can be given after the module sends a game link to one or more referrees as a result of the referrer. This can be in response to a referrer explicating requesting that the module send a game link for the scratch card to one or more referrees. This can also be in response to a referrer posting an invite on their wall of the social network website 102, wherein one or more referrees select the invite. This can also be in response to a referrer sending a private message to one or more referrees, wherein the one or more referrees select the invite in the private message. In some example embodiments, a referrer must send N number of referrees a game link prior to providing a referral reward, where N can be one or greater. If there is a referral reward for sending a game link, operations of the flowchart 1800 continue at 1804. Otherwise, operations continue at 1808.

At block 1806, the module at the wagering game establishment assigns a referral reward to the referrer. In particular, based on prior operations in the flowchart 1700 (see block 1704), it is assumed that a game link for the scratch card has been sent to one or more referrees. The referral reward can be one of a number of rewards relative to the wagering game establishment 104. For example, the reward can be one or more free plays for wagering or non-wagering games (e.g., free scratch cards, sweepstakes, poker, blackjack, slot machine, etc.). The reward can be a bonus monetary amount, actual monetary amount, comps for a room or dinner, etc. Additionally, the reward can be associated with a player membership for the wagering game establishment. Accordingly, the player receives additionally awards that are associated with their membership (e.g., membership points). This referral reward can be considered the easiest to obtain. Therefore, this reward can be a lower end reward (e.g., a free scratch card) relative to the other rewards described below. In particular, the reward can scale up to better prizes relative to the actions of the referrees (as further described below). The operations of the flowchart 1800 continue at 1808.

At block 1808, the module at the wagering game establishment determines whether there is a referral reward for a referree signup for membership at the wagering game establishment. In particular, if one or more referrees sign up as a member of the wagering game establishment as a result of the referral, then a referral reward can be awarded. For example, if one or more referrees signup after the free game play, the referral reward can be awarded. Alternatively, if the one or more referrees signup after the free game play within a defined time period (e.g., one month), the referral reward can be awarded. Alternatively, if the one or more referrees signup after the free game play and there were no other subsequent referrals to the one or more referrees, the referral reward can be awarded. The membership can be for the online and/or brick-and-mortar wagering game establishment. If there is a referral reward for a referree sign up, operations of the flowchart 1800 continue at 1810. Otherwise, operations continue at 1812.

At block 1810, the module at the wagering game establishment determines whether one or more referrees signed up to become members of the wagering game establishment. The requirement can be for that the one to N number referrees signup. If the required number of referrees signed up to become members, operations continue at block 1812. Otherwise, operations continue at block 1814, which is the transition to the flowchart 1900 of FIG. 19.

At block 1812, the module at the wagering game establishment assigns a referral reward to the referrer. As described above, the referral reward can be one of a number of rewards relative to the wagering game establishment 104. For example, the reward can be one or more free plays for wagering or non-wagering games (e.g., free scratch cards, sweepstakes, poker, blackjack, slot machine, etc.). The reward can be a bonus monetary amount, actual monetary amount, comps for a room or dinner, etc. Additionally, the prize from the scratch card can be associated with a player membership for the wagering game establishment. Accordingly, the player receives additionally awards that are associated with their membership (e.g., membership points). This referral reward can be considered more difficult to obtain relative to the above-mentioned reward. Therefore, this reward can be a higher level reward relative to the above-mentioned reward (e.g., 10 free scratch cards, 100 membership points, etc.). The operations of the flowchart 1800 continue at 1814, which is the transition to the flowchart 1900 of FIG. 19.

The operations of the flowchart 1900 begin at block 1901, which is a transition point A between the flowchart 1800 and the flowchart 1900. Operations continue at block 1902.

At block 1902, the module at the wagering game establishment determines whether there is a referral reward for a deposit of real monetary amount from one or more referrees. The requirement can be any money or a defined amount. For example, there would be a referral reward after $1000 is deposited. In some example embodiments, there can be multiple referral rewards relative to depositing of money. For example, there can be a first referral reward for any money deposited; a second referral reward if at least $100 is deposited; a third referral reward if at least $500 is deposited, etc. Also, the referral reward can require N number of referrees to deposit money, where N can be one or greater. If there is a referral reward for deposit of money from one or more referrees, operations continue at block 1904. Otherwise, operations continue at block 1908.

At block 1904, the module at the wagering game establishment determines whether the required deposit of money from one or more referrees was made. As described above, there can be multiple referral rewards that are awarded as the requirements are met. If the required deposit of money from one or more referrees was made, operations continue at block 1906. Otherwise, operations continue at block 1908.

At block 1906, the module at the wagering game establishment assigns a referral reward to the referrer. As described above, the referral reward can be one of a number of rewards relative to the wagering game establishment 104. For example, the reward can be one or more free plays for wagering or non-wagering games (e.g., free scratch cards, sweepstakes, poker, blackjack, slot machine, etc.). The reward can be a bonus monetary amount, actual monetary amount, comps for a room or dinner, etc. Additionally, the prize from the scratch card can be associated with a player membership for the wagering game establishment. Accordingly, the player receives additionally awards that are associated with their membership (e.g., membership points). This referral reward can be considered more difficult to obtain relative to the above-mentioned rewards. Therefore, this reward can be a higher level reward relative to the above-mentioned rewards (e.g., 100 free scratch cards, 1000 membership points, a free comp dinner, etc.). The operations of the flowchart 1900 continue at 1908.

At block 1908, the module at the wagering game establishment determines whether there is a referral reward for wagering game play by one or more referrees. The amount of money required to be wagered can be any money or a defined amount. For example, there would be a referral reward after the referree has wagered $500 at the wagering game establishment. This can be for wagering at the online wagering game establishment, an associated brick-and-mortar wagering game establishment, or a combination thereof. In some example embodiments, there can be multiple referral rewards relative to the wagering by the referree. For example, there can be a first referral reward for any money wagered; a second referral reward if at least $400 is wagered; a third referral reward if at least $1000 is wagered, etc. Also, the referral reward can require N number of referrees to wager money, where N can be one or greater. If there is a referral reward for wagering of money from one or more referrees, operations continue at block 1910. Otherwise, operations of the flowchart 1900 are complete.

At block 1910, the module at the wagering game establishment determines whether the required amount of wagering was performed by one or more referrees. As described above, there can be multiple referral rewards that are awarded as the requirements are met. If the required wagering from one or more referrees was made, operations continue at block 1912. Otherwise, operations of the flowchart 1900 are complete.

At block 1912, the module at the wagering game establishment assigns a referral reward to the referrer. As described above, the referral reward can be one of a number of rewards relative to the wagering game establishment 104. For example, the reward can be one or more free plays for wagering or non-wagering games (e.g., free scratch cards, sweepstakes, poker, blackjack, slot machine, etc.). The reward can be a bonus monetary amount, actual monetary amount, comps for a room or dinner, etc. Additionally, the prize from the scratch card can be associated with a player membership for the wagering game establishment. Accordingly, the player receives additionally awards that are associated with their membership (e.g., membership points). This referral reward can be considered more difficult to obtain relative to the above-mentioned rewards. Therefore, this reward can be a higher level reward relative to the above-mentioned rewards (e.g., 1000 free scratch cards, 10000 membership points, a free comp dinner and hotel night, etc.). The operations of the flowchart 1900 are complete.

The flowchart 1900 provides some non-limiting examples of requirements of a referral reward. There can be other requirements related to the referree activity. For example, the wagering game establishment can provide a referral reward if the referree becomes a referrer. Or, the wagering game establishment can provide a referral reward to a referrer if the referree (acting in the role of a referrer) performed any of the actions described in FIG. 19. In another example, a referral reward can be based on play through requirements. In particular, the referrer receives a referral reward if the referree plays X number of games, Y number of times for a given game, etc.

Figure 20:
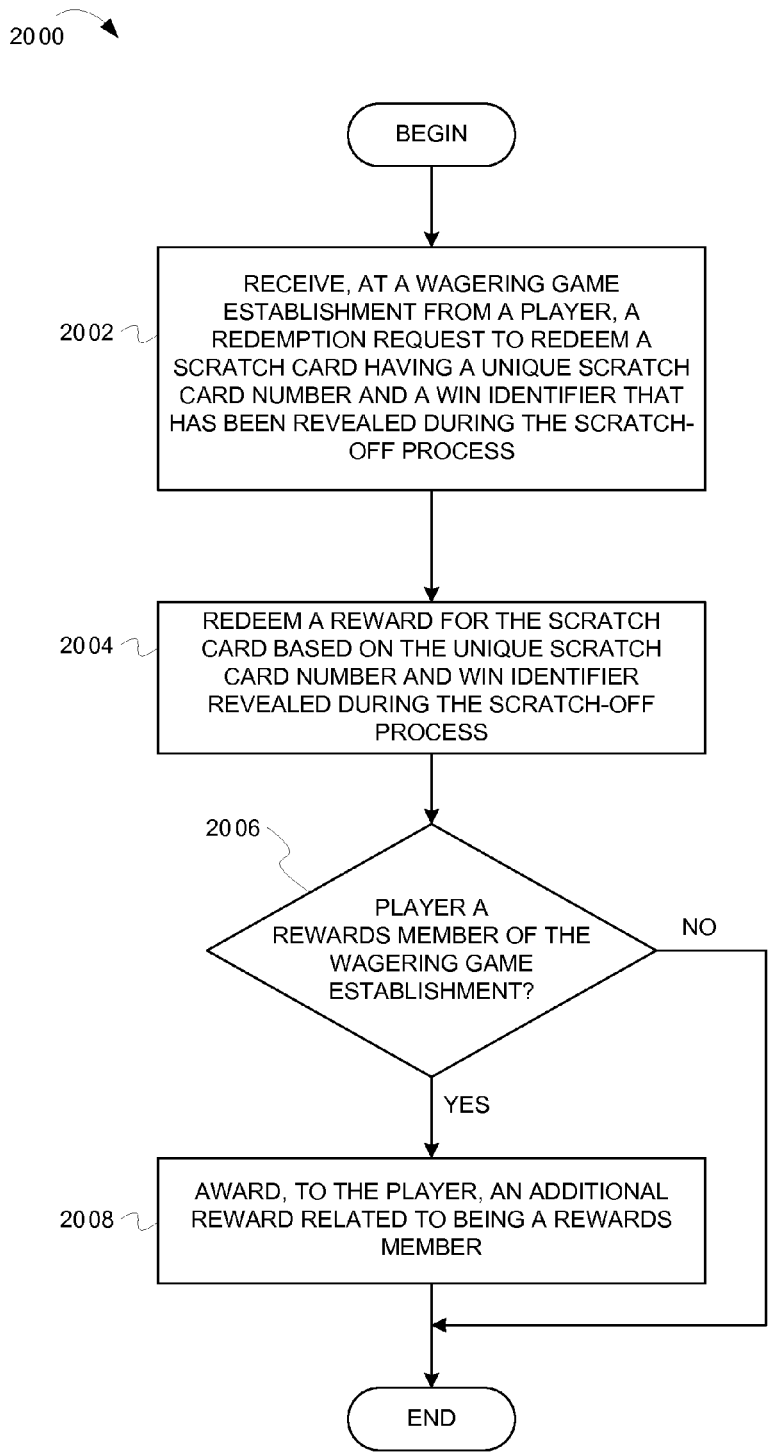
FIG. 20 is a flowchart of operations for increasing wagering game traffic through scratch card redemption at a wagering game establishment, according to some example embodiments.

FIG. 20 is a flowchart of operations for increasing wagering game traffic through scratch card redemption at a wagering game establishment, according to some example embodiments. The operations of the flowchart 2000 begin at block 2002.

At block 2002, the module at the wagering game establishment receives from a player a redemption request to redeem a scratch card having a unique scratch card number and a win identifier that has been revealed during the scratch-off process of the scratch card. With reference to FIG. 1, the module executing on the wagering game establishment 104 can receive a redemption of the scratch card X 134. The module can then redeem the scratch card X (see 130). If the wagering game establishment is online, the player can input the unique scratch card number and win identifier as part of the redemption. With reference to FIGS. 2-3, the unique scratch card number can be scratch card number 250.

With reference to FIGS. 2-12, the win identifier can be a number of different components of the scratch card. In FIG. 3, the win identifier includes the timestamp based on the number of stars revealed. In FIG. 4, the win identifier includes the big win number (see 236). In FIGS. 3-4, if the win is based on the three-match monetary amount, the win identifier includes the monetary amount. In FIG. 6, the win identifier includes the winning symbol(s) and the multiplier 531 (if applicable). Also in FIG. 6, if the win is based on the stars, the win identifier includes the revealed timestamp, big win number, etc. behind the associated number of stars. In FIG. 8, the win identifiers includes the bingo number revealed from behind the number of stars (see 772) or the individual bingo numbers behind each of the scratch-off boxes 702-750. In FIG. 10, the win identifiers include the individual bingo numbers behind each of the scratch-off boxes 902-950. In FIG. 12, the win identifier includes the poker hand number revealed from behind the number of stars (see 1138). Operations of the flowchart 2000 continue.

At block 2004, the module at the wagering game establishment redeems a reward for the scratch card based on the unique scratch card number and win identifier revealed during the scratch-off process. Similar to the operations of the flowcharts 17-19, the rewards can be one or more of bonus monetary amounts, real monetary amounts, free play of wagering and non-wagering games, etc. In some example embodiments, the redemption can be delayed for a time (e.g., 10 minutes) or delayed until the next defined number of wins at the wagering game establishment 104. Accordingly, the player is required to remain at the wagering game establishment 104 for this time period or number of wins in order to redeem their scratch card. If the wagering game establishment is online, the player can visit partnering web sites during this delay. For example, the player can visit certain department store web site, new web sites, etc. The player can then be notified (e.g., pop-up window) when the delay is over and the payout is determined for the scratch card. If the scratch card is physical, a module executing in a machine at a brick-and-mortar wagering game establishment can scan the scratch card. For example, the module can scan a bar code on a back side of the scratch card, perform optical character recognition to identify the card number and win identifiers, etc. The module can then redeem based on the scan of the physical scratch card. Operations of the flowchart 2000 continue.

At block 2006, the module at the wagering game establishment determines whether the player is a rewards member of the wagering game establishment where the redemption occurs. As described above, the redemption can occur at an online wagering game establishment or at a machine of a brick-and-mortar wagering game establishment. If the player is a member of the wagering game establishment, operations continue at 2008. Otherwise, operations of the flowchart 2000 are complete.

At block 2008, the module at the wagering game establishment awards, to the player, an additional reward related to being a rewards member. For example, the additional reward can comprise membership points for free rewards, comps for a dinner or room, etc. The operations of the flowchart 2000 are complete.

While FIGS. 17-19 and 20 describe separate operations, in some example embodiments, the operations can be combined. For example, the referrees in FIGS. 17-19 can redeem their scratch cards using those operations described in FIG. 20.

Operating Environment

This section describes an example operating environment and presents structural aspects of some embodiments. This section includes discussion about wagering game machine architectures and wagering game networks.

Machine Architecture

Figure 21:
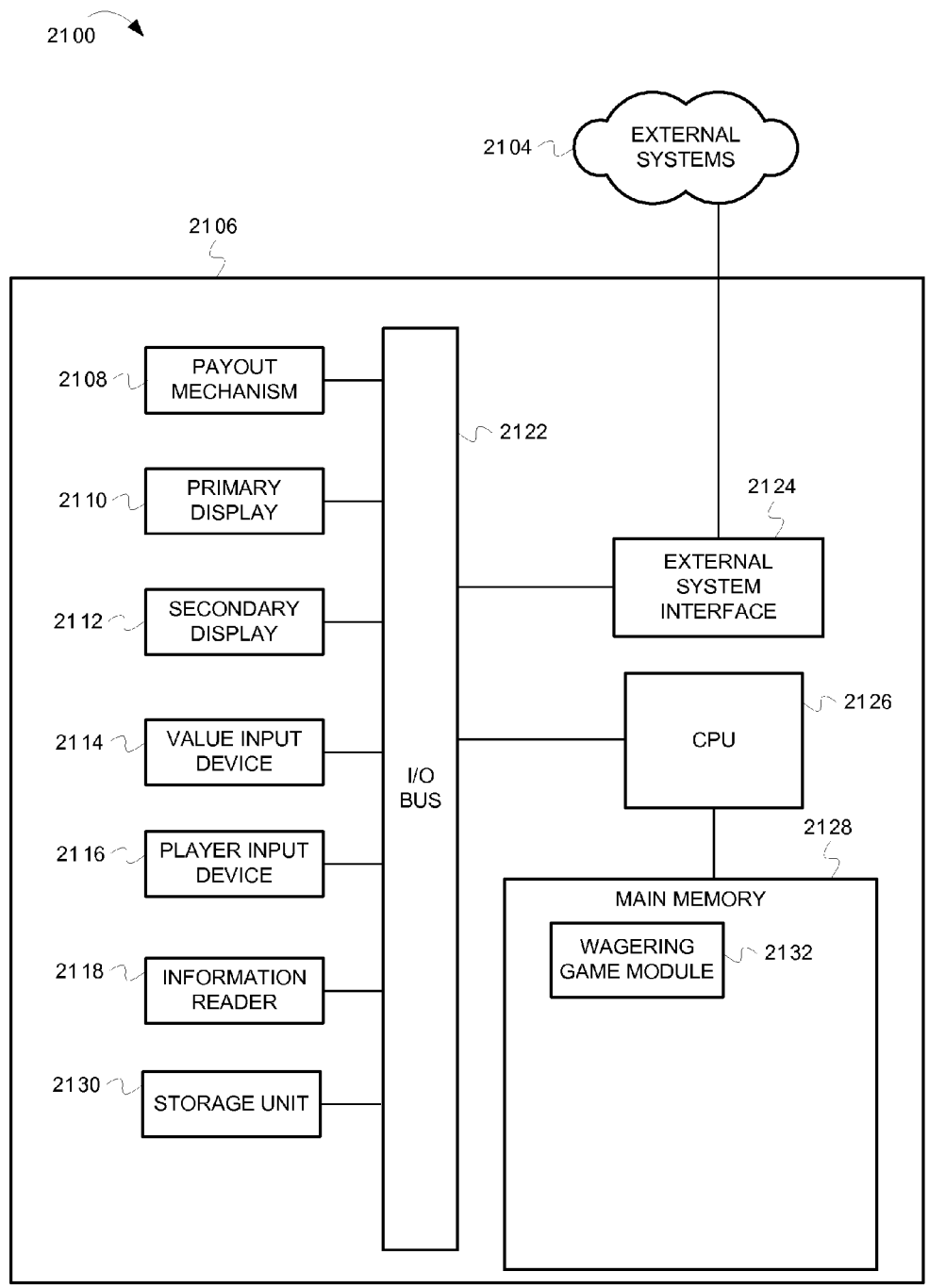
FIG. 21 is a block diagram illustrating a machine architecture, according to some example embodiments.

FIG. 21 is a block diagram illustrating a machine architecture, according to some example embodiments. As shown in FIG. 21, the machine architecture 2100 can be representative of a machine (e.g., a server) that is hosting an online wagering game establishment that can perform operations described herein. The machine architecture 2100 can also be representative of a wagering game machine, redemption device, etc. within a brick-and-mortar wagering game establishment that can perform operations described herein. The machine architecture 2100 includes a machine 2106, which includes a central processing unit (CPU) 2126 connected to main memory 2128. The CPU 2126 can include any suitable processor, such as an Intel® Pentium processor, Intel® Core 2 Duo processor, AMD Opteron™ processor, or UltraSPARC processor. The main memory 2128 includes a module 2132. In some example embodiments, the module 2132 can perform the operations described herein. In some example embodiments, the module can present wagering games, such as video poker, video black jack, video slots, video lottery, etc., in whole or part.

The CPU 2126 is also connected to an input/output (I/O) bus 2122, which can include any suitable bus technologies, such as an AGTL+frontside bus and a PCI backside bus. The I/O bus 2122 is connected to a payout mechanism 2108, primary display 2110, secondary display 2112, value input device 2114, player input device 2116, information reader 2118, and storage unit 2130. The player input device 2116 can include the value input device 2114 to the extent the player input device 2116 is used to place wagers. The I/O bus 2122 is also connected to an external system interface 2124, which is connected to external systems 2104 (e.g., wagering game networks).

In one embodiment, the machine 2106 can include additional peripheral devices and/or more than one of each component shown in FIG. 21. For example, in one embodiment, the machine 2106 can include multiple external system interfaces 2124 and/or multiple CPUs 2126. In one embodiment, any of the components can be integrated or subdivided.

Any component of the architecture 2100 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Wagering Game Machine

Figure 22:
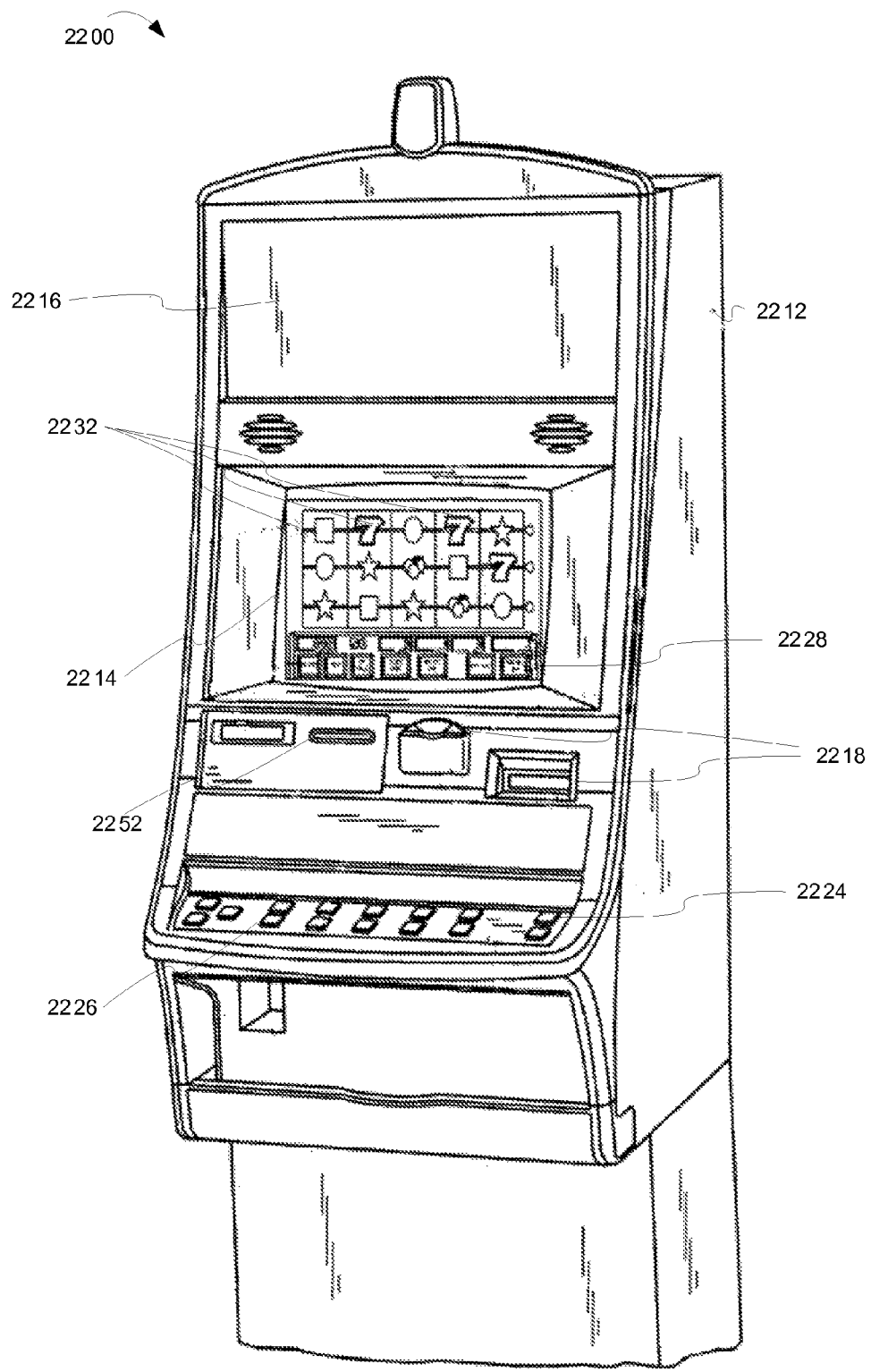
FIG. 22 is a perspective view of a wagering game machine, according to some example embodiments.

FIG. 22 is a perspective view of a wagering game machine, according to some example embodiments. Referring to FIG. 22, a wagering game machine 2200 is used in gaming establishments, such as casinos. According to embodiments, the wagering game machine 2200 can be any type of wagering game machine and can have varying structures and methods of operation. For example, the wagering game machine 2200 can be an electromechanical wagering game machine configured to play mechanical slots, or it can be an electronic wagering game machine configured to play video casino games, such as blackjack, slots, keno, poker, blackjack, roulette, etc.

The wagering game machine 2200 comprises a housing 2212 and includes input devices, including value input devices 2218 and a player input device 2224. For output, the wagering game machine 2200 includes a primary display 2214 for displaying information about a basic wagering game. The primary display 2214 can also display information about a bonus wagering game and a progressive wagering game. The wagering game machine 2200 also includes a secondary display 2216 for displaying wagering game events, wagering game outcomes, and/or signage information. While some components of the wagering game machine 2200 are described herein, numerous other elements can exist and can be used in any number or combination to create varying forms of the wagering game machine 2200.

The value input devices 2218 can take any suitable form and can be located on the front of the housing 2212. The value input devices 2218 can receive currency and/or credits inserted by a player. The value input devices 2218 can include coin acceptors for receiving coin currency and bill acceptors for receiving paper currency. Furthermore, the value input devices 2218 can include ticket readers or barcode scanners for reading information stored on vouchers, cards, or other tangible portable storage devices. The vouchers or cards can authorize access to central accounts, which can transfer money to the wagering game machine 2200.

The player input device 2224 comprises a plurality of push buttons on a button panel 2226 for operating the wagering game machine 2200. In addition, or alternatively, the player input device 2224 can comprise a touch screen 2228 mounted over the primary display 2214 and/or secondary display 2216.

The various components of the wagering game machine 2200 can be connected directly to, or contained within, the housing 2212. Alternatively, some of the wagering game machine's components can be located outside of the housing 2212, while being communicatively coupled with the wagering game machine 2200 using any suitable wired or wireless communication technology.

The operation of the basic wagering game can be displayed to the player on the primary display 2214. The primary display 2214 can also display a bonus game associated with the basic wagering game. The primary display 2214 can include a cathode ray tube (CRT), a high resolution liquid crystal display (LCD), a plasma display, light emitting diodes (LEDs), or any other type of display suitable for use in the wagering game machine 2200. Alternatively, the primary display 2214 can include a number of mechanical reels to display the outcome. In FIG. 22, the wagering game machine 2200 is an "upright" version in which the primary display 2214 is oriented vertically relative to the player. Alternatively, the wagering game machine can be a "slanttop" version in which the primary display 2214 is slanted at about a thirty-degree angle toward the player of the wagering game machine 2200. In yet another embodiment, the wagering game machine 2200 can exhibit any suitable form factor, such as a free standing model, bartop model, mobile handheld model, or workstation console model.

A player begins playing a basic wagering game by making a wager via the value input device 2218. The player can initiate play by using the player input device's buttons or touch screen 2228. The basic game can include arranging a plurality of symbols along a payline 2232, which indicates one or more outcomes of the basic game. Such outcomes can be randomly selected in response to player input. At least one of the outcomes, which can include any variation or combination of symbols, can trigger a bonus game.

In some embodiments, the wagering game machine 2200 can also include an information reader 2252, which can include a card reader, ticket reader, bar code scanner, RFID transceiver, or computer readable storage medium interface. In some embodiments, the information reader 2252 can be used to award complimentary services, restore game assets, track player habits, etc.

GENERAL

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A computerized method comprising:
performing the following operations, by a processor, at an online wagering game website, wherein the operations comprise:
receiving a request, at the online wagering game website from a referrer, to send a link to a scratch card, to a referree through a social networking website, the referree being a friend of the referrer on the social networking website;
transmitting the link for the scratch card to the referree through the social networking website;
receiving the link from the referree through the social networking website;
presenting the scratch card to the referree for play at the online wagering game website;
receiving input for play of the scratch card from the referree; and
redeeming a reward for play of the scratch card in response to a determination that the referree won the reward.

2. The computerized method of claim 1, wherein the operations comprise dynamically determining a result of the play of the scratch card, wherein the result comprises an amount of the reward.

3. The computerized method of claim 1, wherein the operations comprise assigning a referral reward to the referrer.

4. The computerized method of claim 3, wherein assigning the referral reward to the referrer is in response to at least one of:
receiving, from the referrer, the request to send the link to the scratch card to the referree through the social networking website
signing up the referree as a member of the online wagering game website;
receiving, from the referree, a deposit of money for play at the online wagering game website after the referree is the member of the online wagering game website; and
playing, by the referree, an amount of play at the online wagering game website using the deposit of money after the referree is the member of the online wagering game website.

5. The computerized method of claim 1, wherein the reward comprises a bonus monetary reward, wherein the bonus monetary reward is usable at the online wagering game website and is not usable external to the online wagering game website.

6. The computerized method of claim 1, wherein redeeming the reward for play of the scratch card comprises dynamically determining the reward for play of the scratch card.

7. The computerized method of claim 1, wherein the scratch card is redeemable at a wagering game machine at a brick-and-mortar wagering game establishment, wherein the scratch card and the wagering game machine have a same theme.

8. The computerized method of claim 1, wherein the reward for play of the scratch card is derived from play of a wagering game at the online wagering game website.

9. The computerized method of claim 8, wherein the scratch card has a scratch-off box to reveal a timestamp, wherein the reward that was won for the play of the scratch card comprises a monetary value equaling a monetary amount of a progressive jackpot at a time defined by the timestamp of the wagering game played at the online wagering dame website.

10. The computerized method of claim 8,
wherein play of the wagering game at the online wagering game website has resulted in a number of wins that are above a monetary amount, wherein the number of wins are assigned numbers that are in order of time rewarded,
wherein a result of the scratch card comprises a win, wherein the scratch card has a scratch-off box to reveal a win number identifier, wherein the win number identifier equals one of the assigned numbers of the number of wins,
wherein the reward for the win of the scratch card has a monetary value equal to a monetary amount of a win of the number of wins having the one of the assigned numbers equal to the win number identifier.

11. A computerized method comprising:
performing the following operations, by a processor, at an online wagering game website:
receiving a request, at the online wagering game website from a referrer, to send a link to a non-wagering game, to a referee through a social networking website, the referee being a friend of the referrer on the social networking website;

transmitting the link for the non-wagering game to the referee through the social networking website;

assigning a referral reward to the referrer in response to at least one of the following operations:

receiving, from the referrer, the request to send the link to the non-wagering game to the referee through the social networking website;

signing up the referee as a member of the online wagering game website;

receiving, from the referee, a deposit of money for play at the online wagering game website after the referee is the member of the online wagering game website; and playing, by the referee, an amount of play at the online wagering game website using the deposit of money after the referee is the member of the online wagering game website.

12. The computerized method of claim 11, wherein the non-wagering game comprises a scratch card.

13. The computerized method of claim 12, wherein the scratch card is redeemable at a wagering game machine at a brick-and-mortar wagering game establishment, wherein the scratch card and the wagering game machine have a same theme.

14. The computerized method of claim 12, wherein a reward for play of the scratch card is derived from play of a wagering game at the online wagering game website.

15. The computerized method of claim 14, wherein the scratch card has a scratch-off box to reveal a timestamp, wherein the reward for play of the scratch card comprises a monetary value equaling a monetary amount of a progressive jackpot at a time defined by the timestamp of the wagering game played at the online wagering game website.

16. The computerized method of claim 14, wherein play of the wagering game at the online wagering game website has resulted in a number of wins that are above a monetary amount, wherein the number of wins are assigned numbers that are in order of time rewarded, wherein the scratch card has a scratch-off box to reveal a win number identifier, wherein the win number identifier equals one of the assigned numbers of the number of wins, wherein the win of the scratch card has a monetary value equal to a monetary amount of a win of the number of wins having the one of the assigned numbers equal to the win number identifier.

17. The computerized method of claim 11, wherein the assigning the referral reward is in response to playing, by the referee, the amount of play at the online wagering game website using the deposit of money after the referee is the member of the online wagering game website, wherein playing, by the referee, the amount of play comprises playing, by the referee, an amount of wagering game play at the online wagering game website.

18. An apparatus comprising:

a processor in a server hosting an online wagering game establishment;

a module executable on the processor, the module configured to:

receive, from a player, a redemption request to redeem a scratch card, wherein the scratch card is associated with a brick-and-mortar wagering game establishment, and wherein the redemption request comprises a unique scratch card number and a win identifier that comprises at least one of a timestamp and a win symbol that have been revealed during a scratch-off process of the scratch card;

redeem a reward for the scratch card based on the unique scratch card number and the win identifier of the scratch card, wherein the reward is derived from play of a wagering game at the online wagering game establishment; and award an additional reward for the player in response to a determination that the player is a rewards member of the brick-and-mortar wagering game establishment.

19. The apparatus of claim 18, wherein the win identifier comprises the timestamp, wherein the reward for the scratch card comprises a monetary value equaling a monetary amount of a progressive jackpot at the time defined by the timestamp of the wagering game played at the online wagering establishment.

20. The apparatus of claim 19, wherein play of the wagering game at the online wagering game establishment has resulted in a number of wins that are above a monetary amount, wherein the number of wins are assigned numbers that are in order of time rewarded, wherein the win identifier comprises the win symbol, wherein the win symbol equals one of the assigned numbers of the number of wins, wherein the reward for the scratch card has a monetary value equals to a monetary amount of a win of the number of wins having the one of the assigned numbers equal to the win symbol.

21. The apparatus of claim 18, wherein the scratch card comprises at least one of a physical scratch card and an electronic scratch card.

22. The apparatus of claim 18, wherein the win identifier comprises the win symbol, the win symbol being associated with a win at the brick-and-mortar wagering game establishment, and said additional reward being rewarded for the win at the brick-and-mortar wagering game establishment.

23. One or more non-transitory machine-readable storage media including instructions which, when executed by one or more processors, cause the one or more processors to perform operations comprising:

receive a request, at an online wagering game website from a referrer, to send a link to a scratch card, to a referee through a social networking website, the referee being a friend of the referrer on the social networking website;

transmit the link for the scratch card to the referee through the social networking website;

receive the link from the referee through the social networking website;

present the scratch card to the referee for play at the online wagering game website;

receive input for play of the scratch card from the referee; and redeem a reward for play of the scratch card in response to a determination that the referee won the reward.

24. The one or more non-transitory machine-readable storage media of claim 23, wherein the operations comprise dynamically determining a result of the play of the scratch card, wherein the result comprises an amount of the reward.

25. The one or more non-transitory machine-readable storage media of claim 23, wherein the operations comprise assigning a referral reward to the referrer.

26. The one or more non-transitory machine-readable storage media of claim 25, wherein assigning the referral reward to the referrer is in response to at least one of:

receiving, from the referrer, the request to send the link to the scratch card to the referree through the social networking website signing up the referree as a member of the online wagering game website;

receiving, from the referree, a deposit of money for play at the online wagering game website after the referree is the member of the online wagering game website; and playing, by the referree, an amount of play at the online wagering game website using the deposit of money after the referree is the member of the online wagering game website.

27. The one or more non-transitory machine-readable storage media of claim 23, wherein the reward comprises a bonus monetary reward, wherein the bonus monetary reward is usable at the online wagering game website and is not usable external to the online wagering game website.

28. The one or more non-transitory machine-readable storage media of claim 23, wherein the operation to redeem the reward for play of the scratch card comprises dynamic determination of the reward for play of the scratch card.

29. The one or more non-transitory machine-readable storage media of claim 23, wherein the scratch card is redeemable at a wagering game machine at a brick-and-mortar wagering game establishment, wherein the scratch card and the wagering game machine have a same theme.

30. The one or more non-transitory machine-readable storage media of claim 23, wherein the reward for play of the scratch card is derived from play of a wagering game at the online wagering game website.

31. The one or more non-transitory machine-readable storage media of claim 30, wherein the scratch card has a scratch-off box to reveal a timestamp, wherein the reward that was won for the play of the scratch card comprises a monetary value equaling a monetary amount of a progressive jackpot at a time defined by the timestamp of the wagering game played at the online wagering game website.

32. The one or more non-transitory machine-readable storage media of claim 30, wherein play of the wagering game at the online wagering game website has resulted in a number of wins that are above a monetary amount, wherein the number of wins are assigned numbers that are in order of time rewarded, wherein a result of the scratch card comprises a win, wherein the scratch card has a scratch-off box to reveal a win number identifier, wherein the win number identifier equals one of the assigned numbers of the number of wins, wherein the reward for the win of the scratch card has a monetary value equal to a monetary amount of a win of the number of wins having the one of the assigned numbers equal to the win number identifier.

33. An apparatus comprising:

a processor in a server hosting an online wagering game establishment;

a module executable on the processor, the module configured to:

receive, from a player, a redemption request to redeem a scratch card, wherein the scratch card is associated with a brick-and-mortar wagering game establishment, and wherein the redemption request comprises a unique scratch card number and a win identifier that comprises at least one of a timestamp and a win symbol that have been revealed during a scratch-off process of the scratch card;

redeem a reward for the scratch card based on the unique scratch card number and the win identifier of the scratch card, wherein the reward is derived from play of a wagering game at the online wagering game establishment; and award an additional reward for a win at the brick-and-mortal wagering game establishment, wherein the win symbol is associated with the win, and wherein the win identifier comprises the win symbol.

* * * * *